(12) United States Patent
Yan et al.

(10) Patent No.: US 7,071,594 B1
(45) Date of Patent: Jul. 4, 2006

(54) MEMS SCANNER WITH DUAL MAGNETIC AND CAPACITIVE DRIVE

(75) Inventors: Jun Yan, Cincinnati, OH (US); Vincenzo Casasanta, III, Woodinville, WA (US); Selso H. Luanava, Woodinville, WA (US); Hakan Urey, Istanbul (TR); Frank A. DeWitt, IV, Bloomfield, NY (US); Clarence T. Tegreene, Bellevue, WA (US); Christopher A. Wiklof, Everett, WA (US)

(73) Assignee: Microvision, Inc., Redmond, WA (US)

( * ) Notice: Subject to any disclaimer, the term of this patent is extended or adjusted under 35 U.S.C. 154(b) by 136 days.

(21) Appl. No.: 10/700,279

(22) Filed: Nov. 3, 2003

Related U.S. Application Data

(60) Provisional application No. 60/423,584, filed on Nov. 4, 2002.

(51) Int. Cl.
*H02N 1/00* (2006.01)

(52) U.S. Cl. .................. 310/309; 359/225; 359/291

(58) Field of Classification Search ............... 310/309, 310/40 MM; 359/223–226, 291
See application file for complete search history.

(56) References Cited

U.S. PATENT DOCUMENTS

| | | | |
|---|---|---|---|
| 5,467,104 A | 11/1995 | Furness et al. ................. 345/8 |
| 5,557,444 A | 9/1996 | Melville et al. ............. 359/199 |
| 5,629,790 A | 5/1997 | Neukermans et al. ........ 359/198 |
| 5,648,618 A | 7/1997 | Neukermans et al. .... 73/862.08 |
| 5,694,237 A | 12/1997 | Melville ..................... 359/214 |
| 5,701,132 A | 12/1997 | Kollin et al. ................... 345/8 |
| 5,767,666 A | 6/1998 | Asada et al. .................. 324/97 |
| 5,867,297 A | 2/1999 | Kiang et al. ................ 359/198 |
| 5,912,608 A | 6/1999 | Asada ........................ 335/222 |
| 5,969,465 A * | 10/1999 | Neukermans et al. ........ 310/333 |
| 6,122,394 A * | 9/2000 | Neukermans et al. ........ 382/124 |
| 6,140,979 A | 10/2000 | Gerhard et al. ................. 345/7 |
| 6,245,590 B1 | 6/2001 | Wine et al. ................... 438/52 |
| 6,262,827 B1 * | 7/2001 | Ueda et al. ................. 359/224 |
| 6,285,489 B1 | 9/2001 | Helsel et al. ............... 359/291 |
| 6,595,055 B1 | 7/2003 | Schenk et al. ........... 73/514.15 |

FOREIGN PATENT DOCUMENTS

| | | | |
|---|---|---|---|
| JP | 2000-147419 | * | 5/2000 |
| WO | WO025170 A1 | | 2/2003 |

OTHER PUBLICATIONS

Conant, Nee, Lau and Muller, "A Fast Flat Scanning Micromirror," 2000 Solid-State Sensor and Actuator Workshop, Hilton Head, SC, Jun. 2000, pp. 6-9.

(Continued)

*Primary Examiner*—Karl Tamai
(74) *Attorney, Agent, or Firm*—Christopher A. Wiklof

(57) ABSTRACT

A MEMS scanning device includes more than one type of actuation. In one approach capacitive and magnetic drives combine to move a portion of the device along a common path. In one such structure, the capacitive drive comes from interleaved combs. In another approach, a comb drive combines with a pair of planar electrodes to produce rotation of a central body relative to a substrate. In an optical scanning application, the central body is a mirror. In a biaxial structure, a gimbal ring carries the central body. The gimbal ring may be driven by more than one type of actuation to produce motion about an axis orthogonal to that of the central body. In another aspect, a MEMS scanning device is constructed with a reduced footprint.

5 Claims, 15 Drawing Sheets

OTHER PUBLICATIONS

Conant, Nee, Lau and Muller, "Dynamic Deformation of Scanning Micromirrors," presented at IEEE/LEOS Optical MEMS 2000, Kauai, Hawaii, Aug. 2000.

Urey, Dewitt, Lopez, Tauscher, "MEMS Sinusoidal Raster Correction Scanner for SXGA Retinal Scanning /display," MOEMS Display and Imaging Systems, Proc. SPIE vol. 4985, San Jose, CA, Jan. 2003.

Urey, Dewitt, Powell, Bayer, "High-Frequency Raster Pinch correction Scanner for Retinal Scanning Displays," MOEMS and Miniaturized Systems, SPIE vol. 4561, San Francisco, CA, Oct. 2001.

Asada, et al. "Silicon Micromachined Two-Dimensional Glavano Optical Scanner," IEEE Transactions on Magnetics, vol. 30, No. 6, 4647-4649, Nov. 1994.

Kiang, et al., "Micromachined Microscanner for Optical Scanning," SPIE proceedings on Miniaturized Systems with Micro-Optics and Micromachines II, vol. 3008, Feb. 1997, pp. 82-90.

* cited by examiner

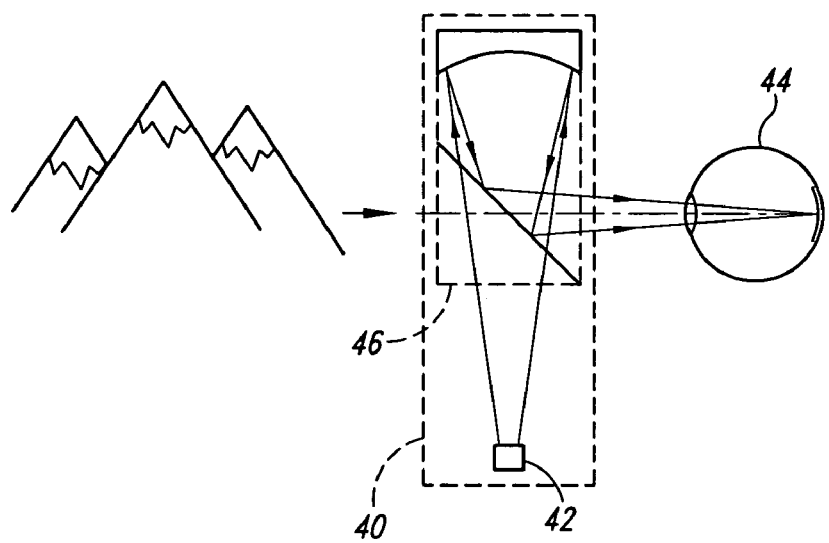
Fig. 1
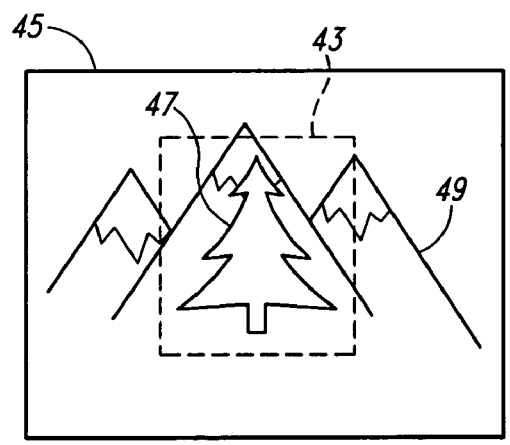 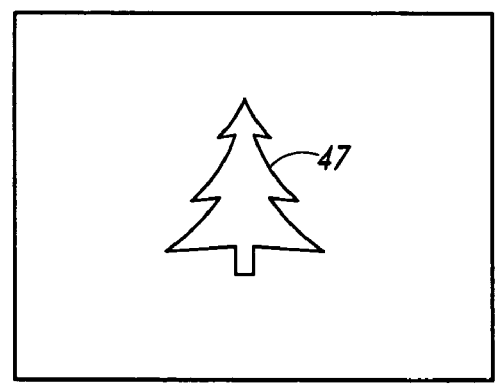
Fig. 2A  Fig. 2B

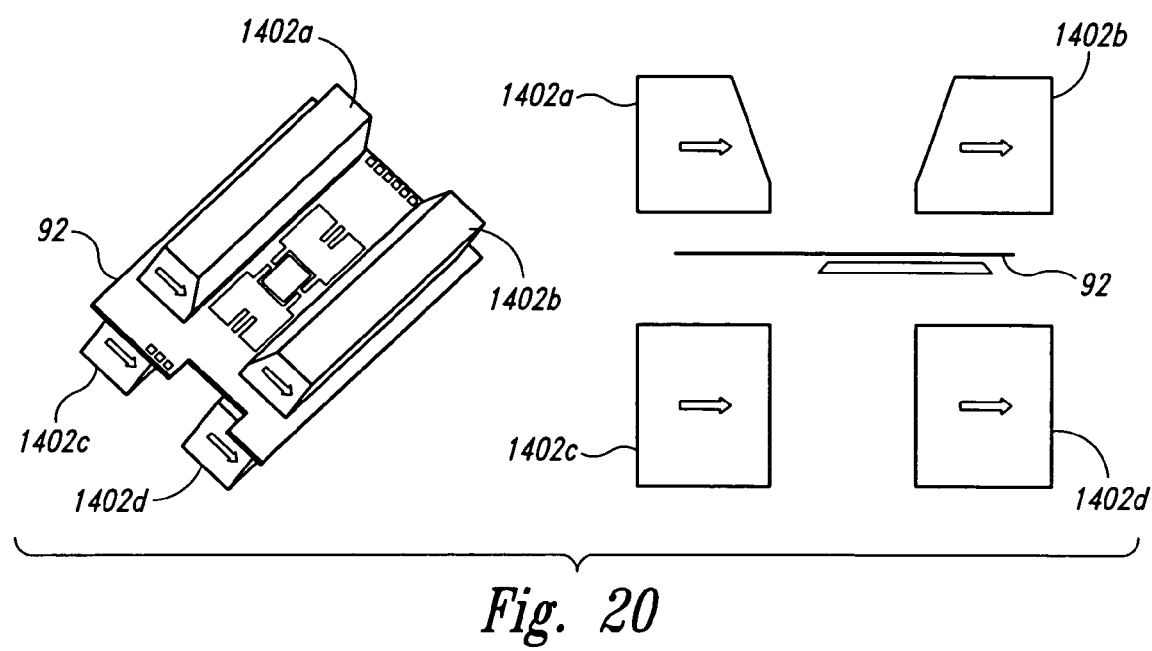
*Fig. 20*
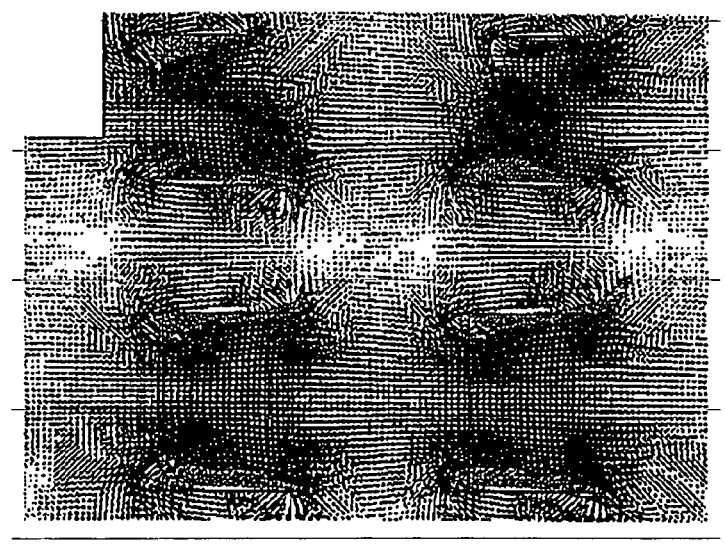
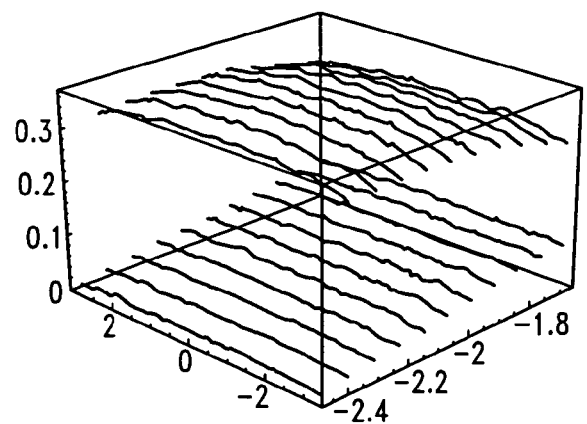
*Fig. 21*

MEMS SCANNER WITH DUAL MAGNETIC AND CAPACITIVE DRIVE

This application claims benefit of Provisional application Ser. No. 60/423,584 filed Nov. 4, 2002.

TECHNICAL FIELD

The present invention relates to microelectromechanical system (MEMS) devices and, more particularly, to MEMS devices with motive forces.

CROSS REFERENCES TO RELATED APPLICATIONS

The present application depends from Provisional Patent Application No. 60/423,584 entitled MEMS DRIVE STRUCTURES, by Yan et al., filed Nov. 4, 2002.

BACKGROUND OF THE INVENTION

A variety of approaches to actuating MEMS devices have been described. Some approaches use magnetic fields to pivot a moving member relative to a substrate. One such approach is described in U.S. Pat. No. 5,912,608 to Asada, entitled PLANAR TYPE ELECTROMAGNETIC ACTUATOR and U.S. Pat. No. 5,767,666 to Asada et al., entitled PLANAR TYPE ELECTROMAGNETIC ACTUATOR INCORPORATING A DISPLACEMENT DETECTION FUNCTION, each of which is incorporated herein by reference. Other approaches use electrostatic forces to pivot a moving member or to drive a sliding piece relative to a substrate. Examples of such devices can be found in U.S. Pat. No. 5,629,790 to Neukermans et al., entitled MICROMACHINED TORSIONAL SCANNER and U.S. Pat. No. 5,867,297 to Kiang et al., entitled APPARATUS AND METHOD FOR OPTICAL SCANNING WITH AN OSCILLATORY MICROELECTROMECHANICAL SYSTEM, each of which is incorporated herein by reference.

Among the applications for such MEMS devices are scanning beam imaging, including image acquisition and display. In image acquisition, such MEMS devices typically include a mirror that pivots to sweep a beam through a prescribed scanning field. A detector in the imaging device collects reflected light and produces an electrical signal in response. A processor then identifies image information from the electrical signal. Equipment incorporating such devices can be found in barcode readers, image capture systems, confocal imagers, and other applications.

Scanning beam displays, such as that described in U.S. Pat. No. 5,467,104 of Furness et al., entitled VIRTUAL RETINAL DISPLAY, which is incorporated herein by reference, are one approach to overcoming many limitations of conventional displays. As shown diagrammatically in FIG. 1, in one embodiment of a scanned beam display 40, a scanning source 42 outputs a scanned beam of light that is coupled to a viewer's eye 44 by a beam combiner 46. In some scanned displays, the scanning source 42 includes a scanner, such as scanning mirror or acousto-optic scanner, that scans a modulated light beam onto a viewer's retina. In other embodiments, the scanning source may include one or more light emitters that are rotated through an angular sweep.

The scanned light enters the eye 44 through the viewer's pupil 48 and is imaged onto the retina 59 by the cornea. In response to the scanned light the viewer perceives an image. In another embodiment, the scanned source 42 scans the modulated light beam onto a screen that the viewer observes. One example of such a scanner suitable for either type of display is described in U.S. Pat. No. 5,557,444 to Melville et al., entitled MINIATURE OPTICAL SCANNER FOR A TWO-AXIS SCANNING SYSTEM, which is incorporated herein by reference.

Sometimes such displays are used for partial or augmented view applications. In such applications, a portion of the display is positioned in the user's field of view and presents an image that occupies a region 43 of the user's field of view 45, as shown in FIG. 2A. The user can thus see both a displayed virtual image 47 and background information 49. If the background light is occluded, the viewer perceives only the virtual image 47, as shown in FIG. 2B.

As shown diagrammatically in FIG. 3, the scanning source 42 includes an optical source 50 that emits a beam 52 of modulated light. In this embodiment, the optical source 50 is an optical fiber that is driven by one or more light emitters, such as laser diodes (not shown). A lens 53 gathers and focuses the beam 52 so that the beam 52 strikes a turning mirror 54 and is directed toward a horizontal scanner 56. The horizontal scanner 56 scans the beam 52 periodically in a sinusoidal fashion. The horizontally scanned beam then travels to a vertical scanner 58 that scans periodically to sweep the horizontally scanned beam vertically. For each angle of the beam 52 from the scanners 56 and 58, an exit pupil expander 62 converts the beam 52 into a set of beams 63. Eye coupling optics 60 collect the beams 63 and form a set of exit pupils 65. The exit pupils 65 together act as an expanded exit pupil for viewing by a viewer's eye 44. One such expander is described in U.S. Pat. No. 5,701,132 of Kollin et al., entitled VIRTUAL RETINAL DISPLAY WITH EXPANDED EXIT PUPIL, which is incorporated herein by reference.

Returning to the description of scanning, as the beam scans through each successive location in the beam expander 62, the beam color and intensity is modulated in a fashion to be described below to form a respective pixel of an image. By properly controlling the color and intensity of the beam for each pixel location, the display 40 can produce the desired image.

Simplified versions of respective electrical waveforms for vertical and horizontal scanning are shown in FIGS. 4A and 4B. Responsive to the electrical waveforms, the beam traces the pattern 68 shown in FIG. 5 in an image plane, such as the plane of beam expander 62 of FIG. 3. Though FIG. 5 shows only eleven lines of image, one skilled in the art will recognize that the number of lines in an actual display will typically be much larger than eleven.

As can be seen by comparing the actual scan pattern 68 to a desired raster scan pattern 70, the actual scanned beam 68 can be "pinched" at the outer edges of the beam expander 62. That is, in successive forward and reverse sweeps of the beam, the pixels near the edge of the scan pattern are unevenly spaced. This uneven spacing can cause the pixels to overlap or can leave a gap between adjacent rows of pixels. Moreover, because the image information is typically provided as an array of data, where each location in the array corresponds to a respective position in the ideal raster pattern 70, the displaced pixel locations can cause image distortion. Some approaches to treating such distortions or image imperfections are described in U.S. Pat. No. 6,140,979 to Gerhard, et al. entitled SCANNED DISPLAY WITH PINCH TIMING AND DISTORTION CORRECTION, which is incorporated herein by reference.

For a given refresh rate and a given wavelength, the number of pixels per line is determined in the structure of FIG. 3 by the mirror scan angle θ and mirror dimension D perpendicular to the axis of rotation. For high resolution, it is therefor desirable to have a large scan angle θ and a large mirror. However, larger mirrors and scan angles typically correspond to lower resonant frequencies. A lower resonant frequency provides fewer lines of display for a given period. Consequently, a large mirror and larger scan angle may produce unacceptable refresh rates for many MEMS scanners.

OVERVIEW OF THE INVENTION

In one embodiment, a MEMS device includes a moving portion, a first electromagnetic field based actuator coupled to drive the moving portion along a first path, and second electromagnetic field based actuator coupled to drive the moving portion along the first path, wherein the first and second electromagnetic actuators to utilize different types of electromagnetic interaction to drive the moving portion along the first path. In one embodiment, the first electromagnetic actuator is an electrostatic actuator and the second electromagnetic actuator is a magnetic actuator. In another embodiment, the first electromagnetic actuator is electrostatic actuator and the second electromagnetic actuator is a comb-drive actuator.

In one embodiment, a MEMS device includes a coil carried by a moving member that interacts with a static magnetic field to provide a drive force along a selected path. The MEMS device also includes a capacitor plate aligned to provide a drive force along the selected path. A drive circuit actuates both the coil and the capacitor plate to produce a joint drive force that is a combination of the drive force from the coil and the drive force from the capacitor plate.

In one embodiment, the scanning mechanism includes a biaxial scanner that uses a single mirror to provide both horizontal and vertical movement of one or more beams. The biaxial scanner is formed from a gimbal structure having a central mirror portion and a surrounding portion that carries the central mirror portion. A substrate carries the surrounding portion. The central mirror portion is driven by one or more of electrostatic and magnetic forces. The surrounding portion is driven by electrostatic and magnetic forces.

In another approach, a biaxial MEMS scanner utilizes magnetically and capacitively generated forces to drive the central mirror portion. In still other approaches, a single axis scanner includes magnetic and capacitive actuators that jointly drive a central body about an axis.

In other embodiments, other types of MEMS devices, such as gyroscopes include magnetic and capacitive actuators that jointly drive a central body about an axis. In another embodiment, a MEMS device includes a capacitive plate type of actuator and a comb drive actuator that jointly drive a central body. The comb drive may be a push-pull type as described in WO025170A1: MICROMECHANICAL COMPONENT COMPRISING AN OSCILLATING BODY of Schenk et al or may be an offset comb drive such as that described in Conant, Nee, Lau and Muller; "A Fast Flat Scanning Micromirror", 2000 Solid-State Sensor and Actuator Workshop, Hilton Head, S.C., June 2000, pp. 6–9; and R. Conant, J. Nee, K. Lau, R. Muller, "Dynamic Deformation of Scanning Micromirrors," presented at IEEE/LEOS Optical MEMS 2000, Kauai, Hi., August 2000.

In one embodiment, a display incorporates a MEMS device that includes a plurality of actuators of different types.

In one embodiment, the MEMS scanner is a resonant scanner that has a characteristic resonant frequency. Where the resonant frequency does not match the rate at which image data is supplied, data may be clocked into and out of the a buffer at different rates.

Alternatively, the MEMS scanner may have a tunable resonant frequency that can be adjusted to conform to the rate at which image data is provided. In one embodiment of such a MEMS scanner, described in U.S. Pat. No. 6,245,590 to Wine, et al., entitled FREQUENCY TUNABLE RESONANT SCANNER AND METHOD OF MAKING, which is incorporated herein by reference, a primary oscillatory body carries a secondary mass that can move relative to the primary oscillatory body, thereby changing the rotational inertia. The changed rotational inertia changes the resonant frequency and can be controlled by an applied control signal. By monitoring movement of the oscillatory body and comparing the monitored movement to the desired scanning frequency, a control circuit generates the appropriate control signal to synchronize the scanning frequency to the input data rate.

In another embodiment MEMS scanner is actively tunable. The scanner includes a torsion arm that supports an oscillatory body. The torsion arm includes a responsive coating. The responsive coating, in one embodiment, absorbs or outgasses a selected gas as controlled by an input electrical signal or other approaches to controlling gas concentration in the responsive coating. The gas concentration controls the mechanical properties of the responsive coating, thereby affecting the mechanical properties of the torsion arm. Because the mechanical properties of the torsion arm affect the resonant frequency, the resonant frequency can be controlled by the input electrical signal or other inputs that control gas concentration in the responsive coating.

In one embodiment, an imager includes a MEMS scanner having a plurality of actuators of different types. In one approach, the imager acquires images using a plurality of separate detector and optical source pairs. One embodiment of the imager includes LEDs or lasers as the optical sources, where each of the optical sources is at a respective wavelength. The scanning assembly simultaneously directs light from each of the optical sources to respective locations an image field. During the time light from its respective light source strikes each location in the image field, each detector selectively detects light at the wavelength, polarization, or other characteristic of its corresponding source, according to the reflectivity of the respective location. The detectors output electrical signals to decoding electronics that store data representative of the image field.

In one embodiment, the imager includes a plurality of detector/optical source pairs, where each pair operates at a respective wavelength within its band. For example, a first of the pairs may be a red pair that operates at a first red wavelength and a second of the pairs operates at a second red wavelength different from the first.

In one embodiment of an imager including a plurality of optical sources, each of the optical sources is modulated with a carrier frequency. One or more optical detectors receives the reflected light and produces an electrical signal in response. Frequency components of the electrical signal are separated using conventional techniques. Then, the separated components are decoded to produce data corresponding to the image field. From the data, a representation of the image field can be produced or data represented by a pattern of reflectivity in the image field can be identified.

In one embodiment of an imager, a first optical source is directed toward the first location in an image field and second optical source is directed toward second location in the image field. The first optical source is activated during selected intervals, typically in a periodic fashion. The second optical source is activated during periods when the first optical source is inactive. A detector receives light reflected from the image field during both the intervals when the first optical source is activated and intervals when the second optical source is activated. The detector produces an electrical signal corresponding to the light reflected in both sets of intervals. Using conventional time-division demultiplexing, the electrical signal can be decoded to identify a pattern of reflectivity of areas illuminated by the first and second optical sources.

In another embodiment, similar to the previously described embodiment, separate detectors are used for each of the respective light sources. Each of the detectors is activated during the periods when its respective light source is active for the electrical output of the detector is sampled during the active period.

In one embodiment, a pair of optical sources alternately feed a single scanner from different angles. During forward sweeps of the scanner, a first of the sources emits light modulated according to one half of a line. During the return sweep, the second source emits light modulated according to the second half of the line. Because the second sweep is in the opposite direction from the first, data corresponding to the second half of the line is reversed before being applied to the second source so that light from the second source is modulated to write the second half of the line in reverse.

In one embodiment of the alternate feeding approach, a single light emitter feeds an input fiber that is selectively coupled to one of two separate fibers by an optical switch. During forward sweeps, the optical switch couples the input fiber to a first of the separate fibers so that the first separate fiber forms the first optical source. During reverse sweep, the optical switch feeds the second separate fiber so that the second separate fiber forms the second source. This embodiment thus allows a single light emitter to provide light for both optical sources.

The alternate feeding approach, different wavelength approach, and time division multiplexing approach can be expanded to write more than just two tiles or two lines or to capture images from more than just two tiles or two lines.

In one approach, the input fiber is coupled to four fibers by a set of optical switches, where each fiber feeds the scanning assembly from a respective angle. The switches are activated according to the direction of the sweep and according to the tracked location of the user's vision. For example, when the user looks at the top half of the image, a first fiber, aligned to produce an image in the upper left tile feeds the scanner during the forward sweeps. A second fiber, aligned to produce an upper right tile feeds the scanner during reverse sweeps. When the user looks at the lower half of the image, a third fiber, aligned to produce the lower left tile, feeds scanner during forward sweeps. A fourth fiber, aligned to produce the lower right tile, feeds the scanner during reverse sweeps.

In another aspect, a MEMS drive circuit is adapted to driving a dual-drive MEMS device. In one exemplary embodiment, a single AC source drives both an electrostatic actuator and an electromagnetic actuator.

In another aspect, improved magnet designs offer increased useable magnetic field strength for moving coil magnetic actuators.

According to another embodiment, magnet size is reduced while maintaining sufficient magnetic field strength across the actuator.

In another embodiment a push-pull moving coil magnetic actuator uses a pair of counter-wound coils that produce antiparallel driving fields. The counter-wound coils are placed across an axis of rotation from one another. During one half-phase, their antiparallel driving fields produce simultaneous repulsion and attraction forces that tend to rotate the MEMS device in a given direction around its axis of rotation. During the subsequent half-phase, the fields are reversed, causing rotation in the opposite direction.

BRIEF DESCRIPTION OF THE FIGURES

FIG. 1 is a diagrammatic representation of an augmented display aligned to a viewer's eye.

FIG. 2A is a view of an augmented image overlaying a background.

FIG. 2B is a view of an augmented image with the background obscured.

15A and 15B. The magnetic field strength is shown in the upper view. Magnet dimensions and orientations are shown below.

Figure 17:
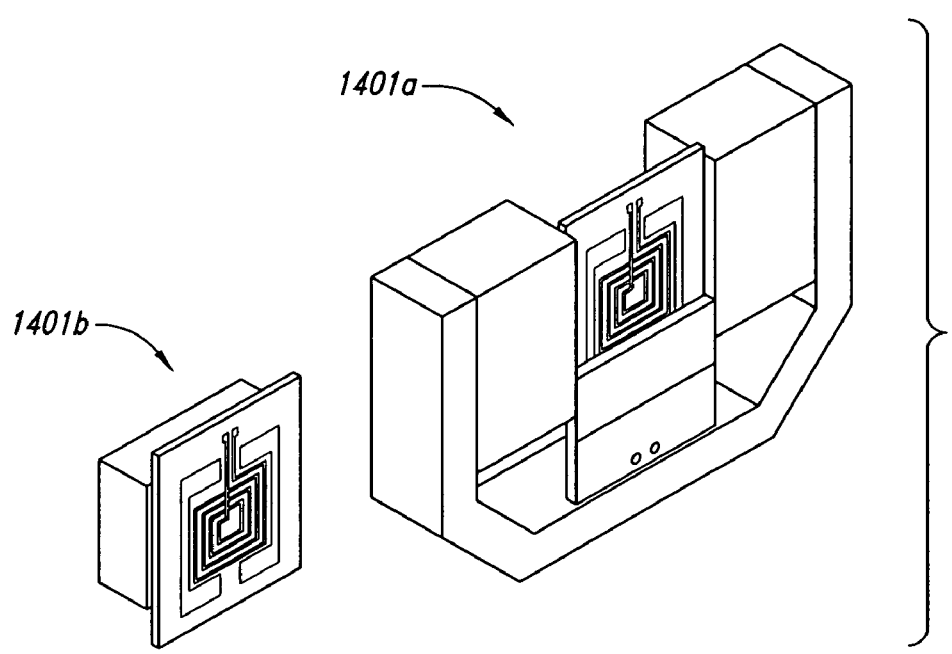

FIG. 17 is a side-by-side comparison of a two-coil, small bottom magnet design (left) and one-coil side magnet design (right).

Figure 18:
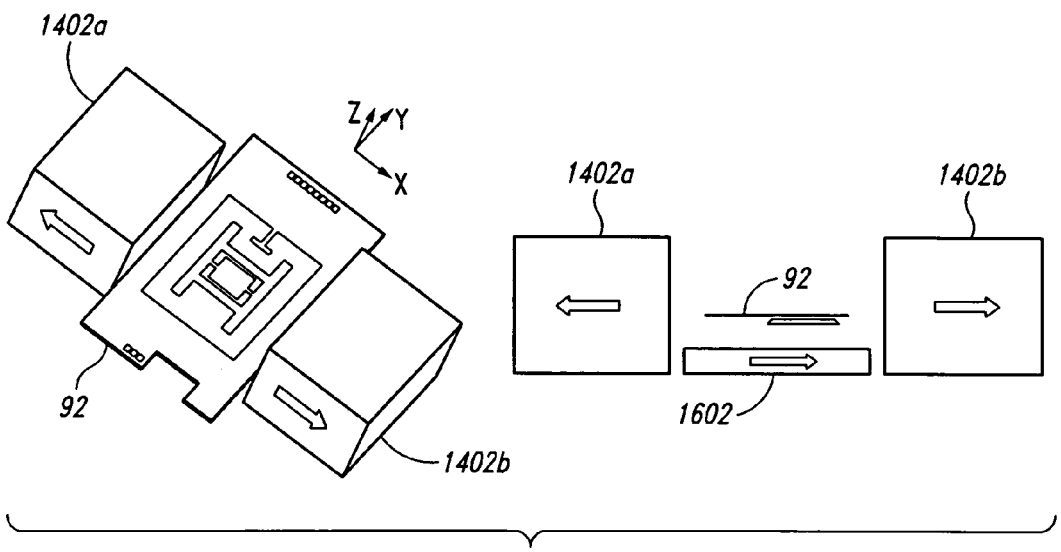

FIG. 18 illustrates the configuration of a MEMS die and magnets. Arrows superimposed on the magnets denote the magnetization directions. An isometric view is shown on the left and an elevation view on the right.

Figure 19:
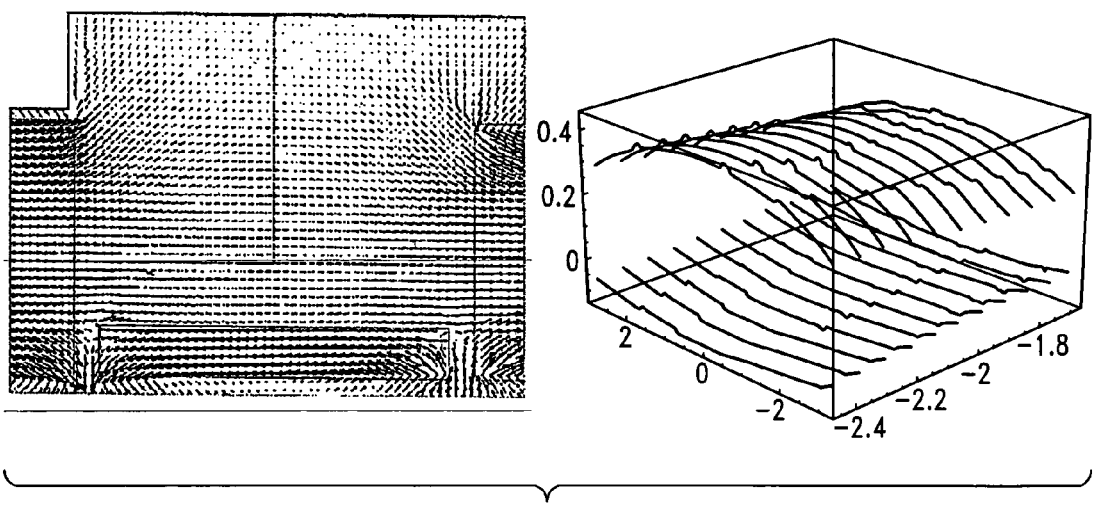

FIG. 19 presents FEA model results showing the magnetic field for the magnet design of FIG. 18. The B vectors of the magnets are shown on the left. A Bx/Bz comparison at the driving coils is shown on the right.

FIG. 20 illustrates an alternative top-and-bottom magnet design for a moving coil MEMS scanner. Arrows superimposed on the magnets denote the magnetization directions. An isometric view and corresponding elevation view are shown on the left and right, respectively.

FIG. 21 presents FEA model results showing the magnetic field for the magnet design of FIG. 20. The B vectors of the magnets are shown in the upper view. A Bx/Bz comparison at the driving coils is shown in the lower view.

Figure 22:
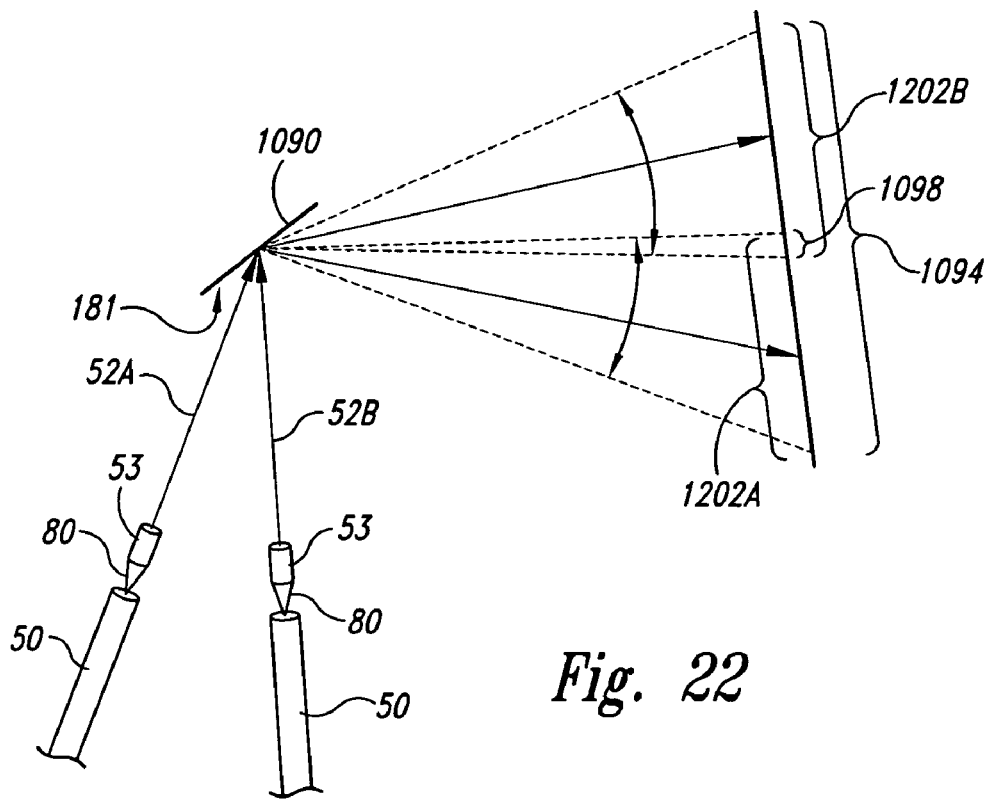

FIG. 22 is a diagrammatic representation of scanning with two input beams, showing slightly overlapped tiles.

Figure 23:
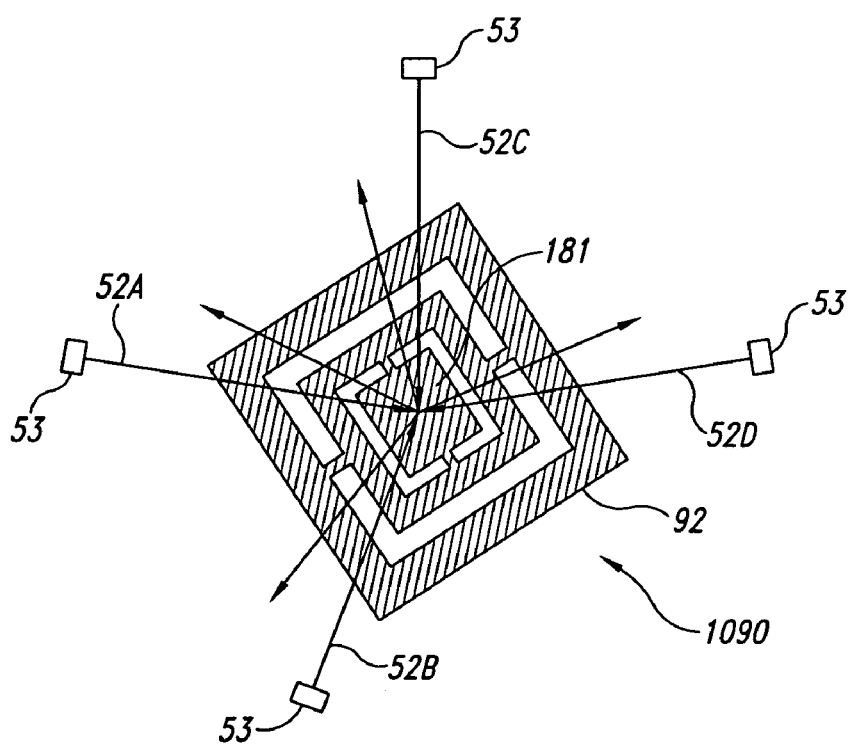

FIG. 23 is a top plan view of a biaxial scanner showing four feeds at spatially separated locations.

Figure 11:
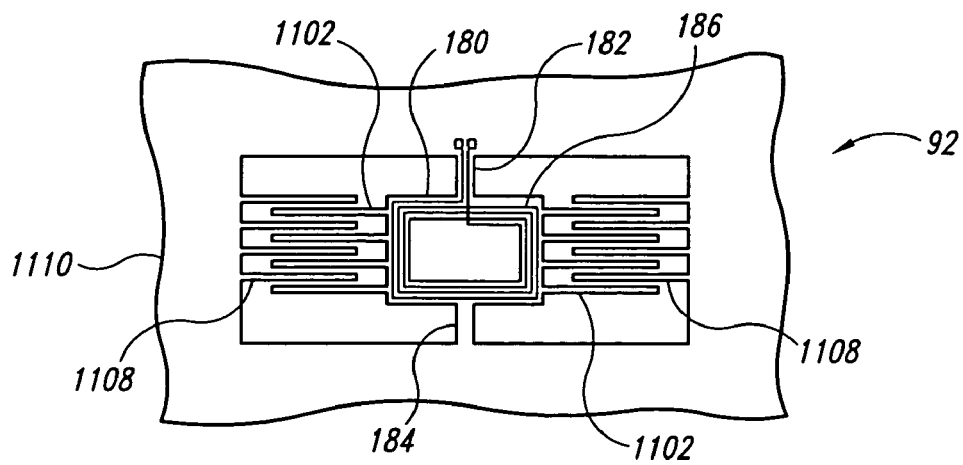
FIG. 11 is a diagrammatic view of a MEMS scanner incorporating a dual-drive actuator using comb-drive electrostatic and moving coil electromagnetic.
Figure 24:
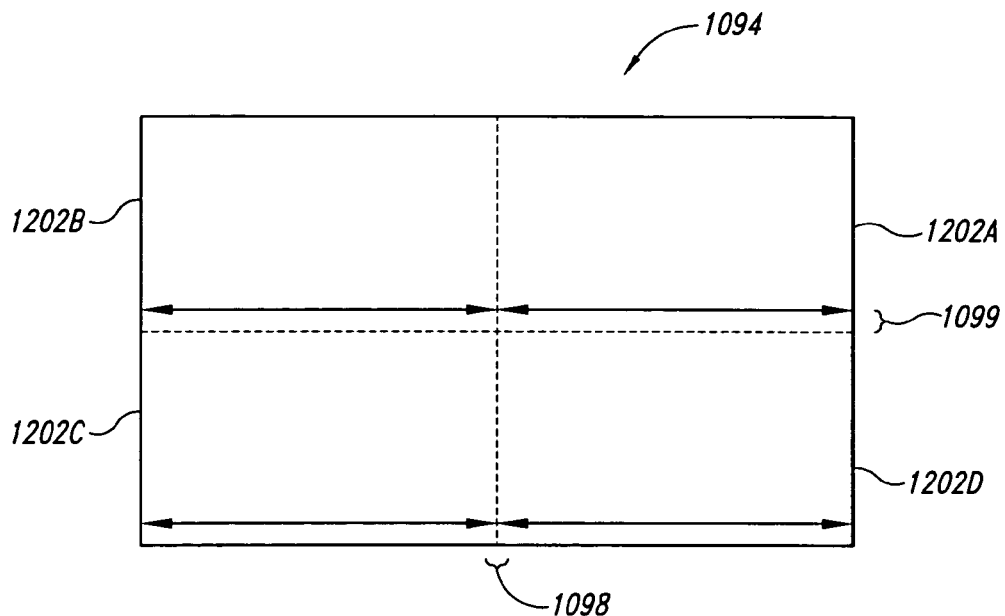

FIG. 24 is a diagrammatic representation of four tiles produced by the four feed scanner of FIG. 11.

Figure 25:
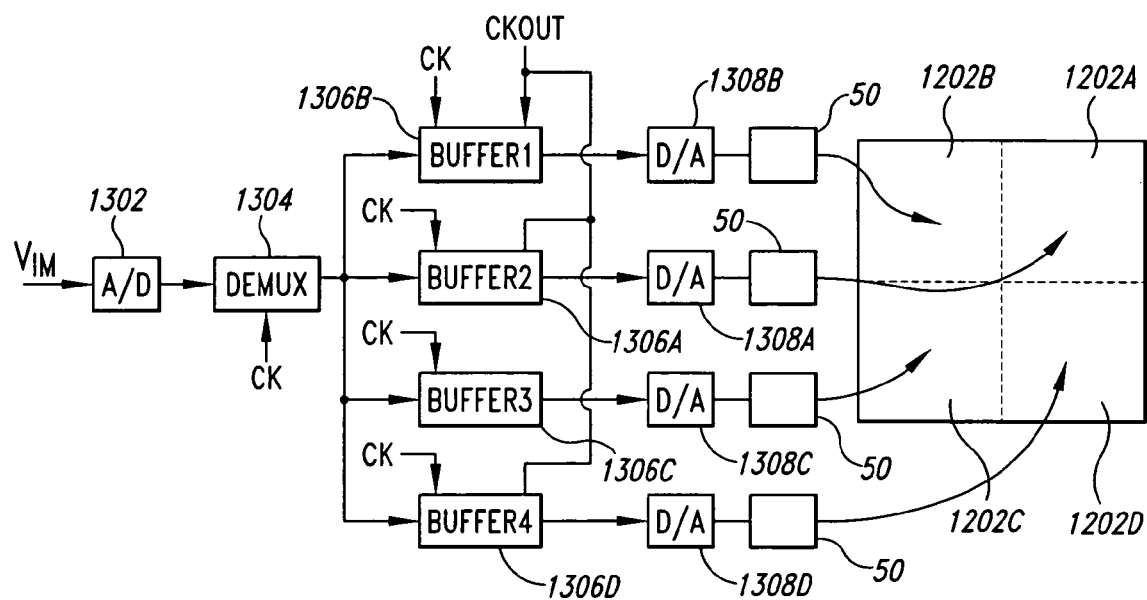

FIG. 25 is a schematic of a system for driving the four separate feeds of FIG. 23, including four separate buffers.

Figure 26:
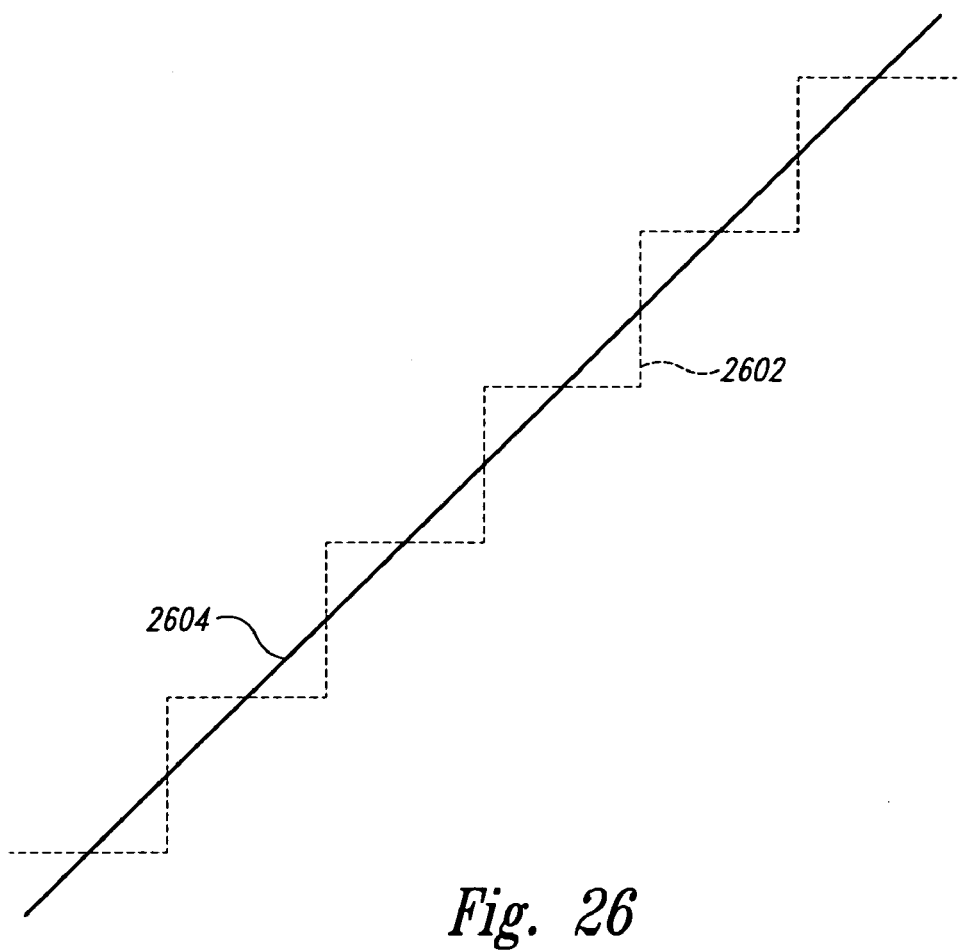

FIG. 26 is a signal-timing diagram comparing a ramp signal with a desired signal for driving the vertical scanner.

Figure 27:
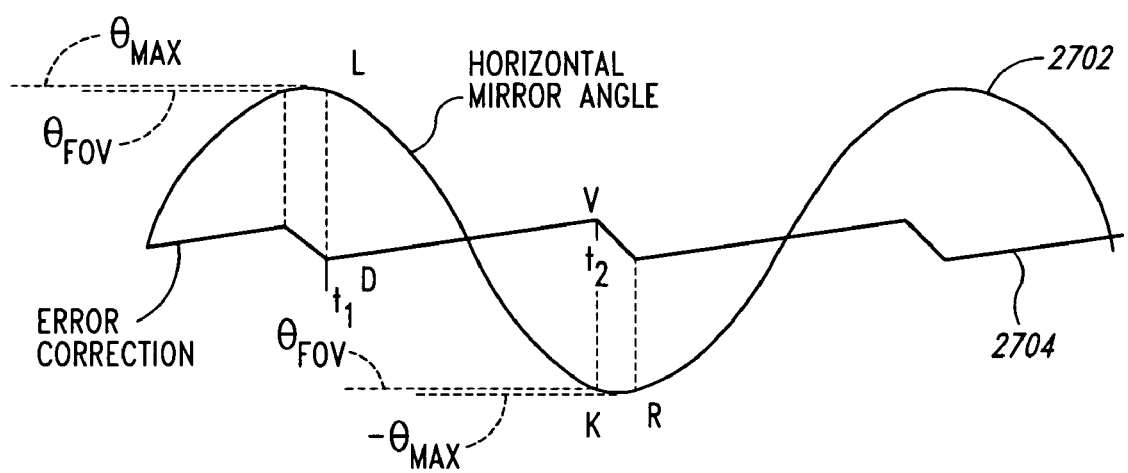

FIG. 27 is a signal timing diagram showing positioning error correction for the vertical scanning position.

Figure 28:
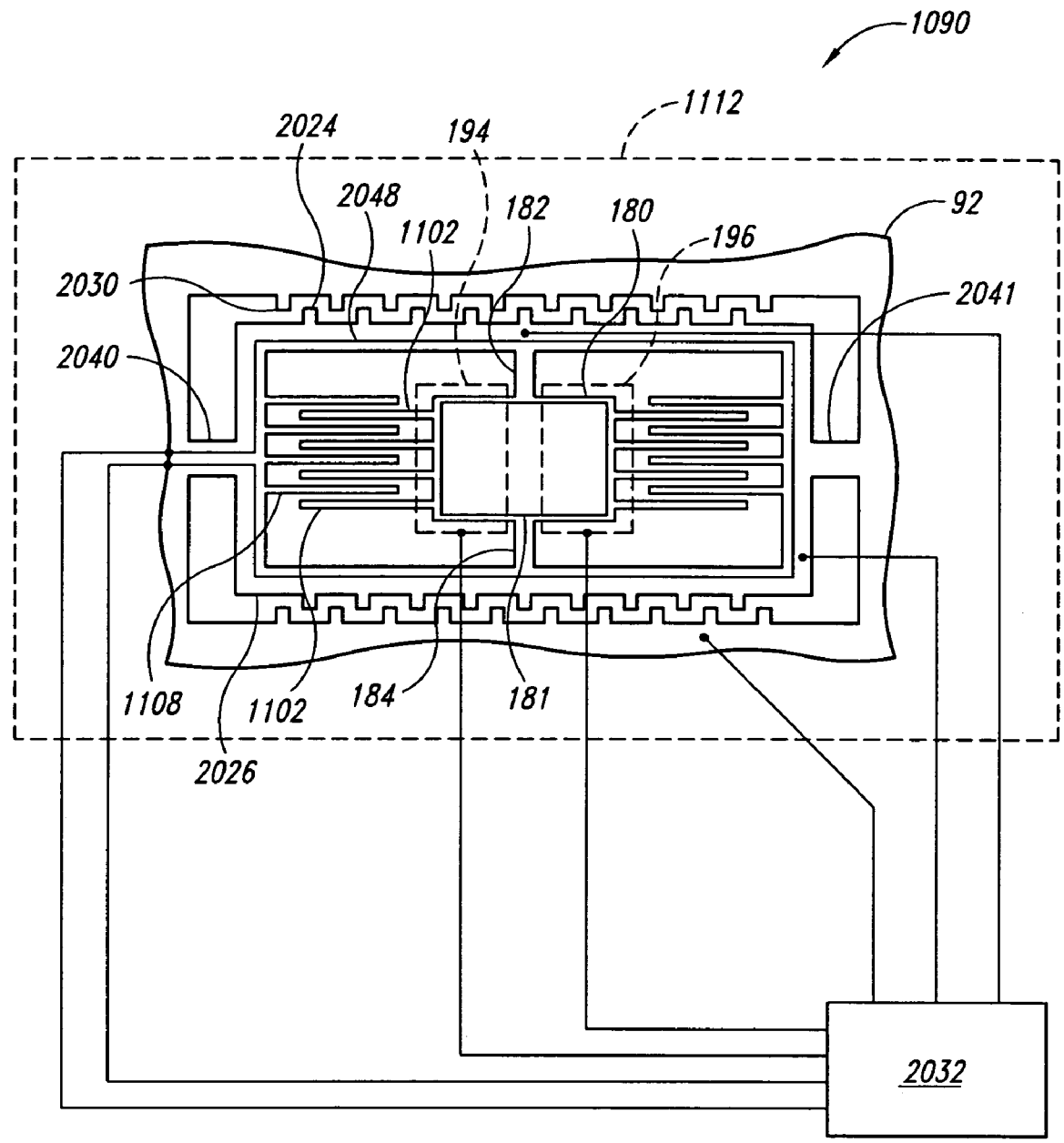

FIG. 28 is a top view of a biaxial scanner including dual vertical and horizontal drives.

Figure 29:
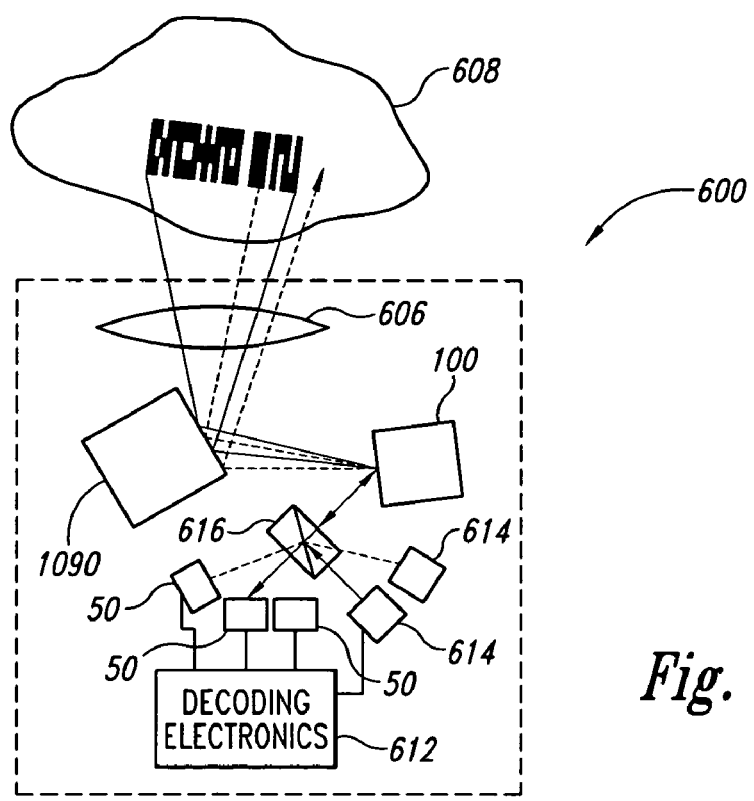

FIG. 29 is a diagrammatic view of an imager that acquires an image from a target object.

Figure 30:
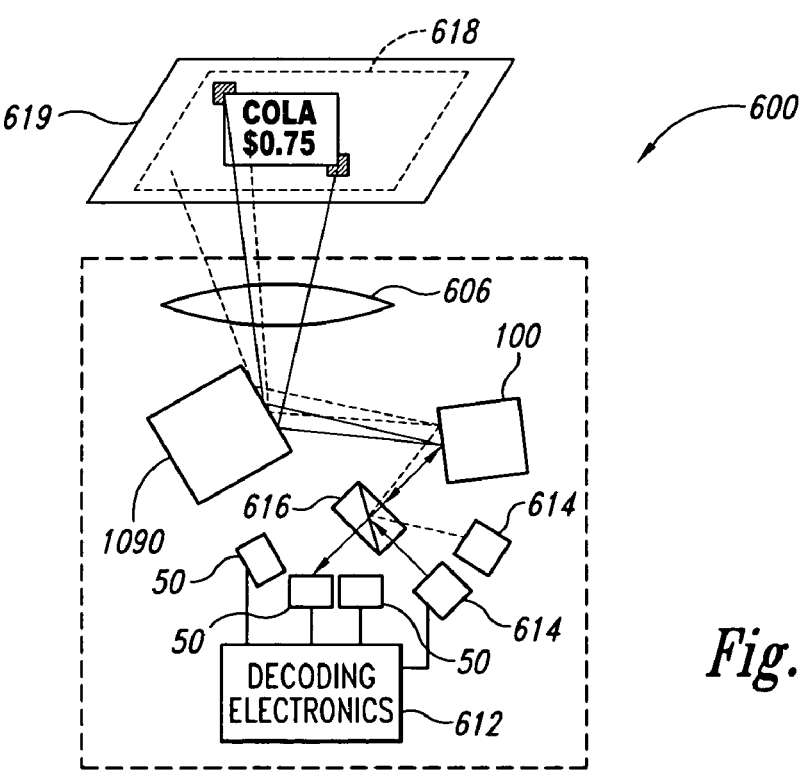

FIG. 30 is a diagrammatic view of an alternative embodiment of the imager of FIG. 29 that also projects a visible image.

DETAILED DESCRIPTION OF THE INVENTION

Figure 6:
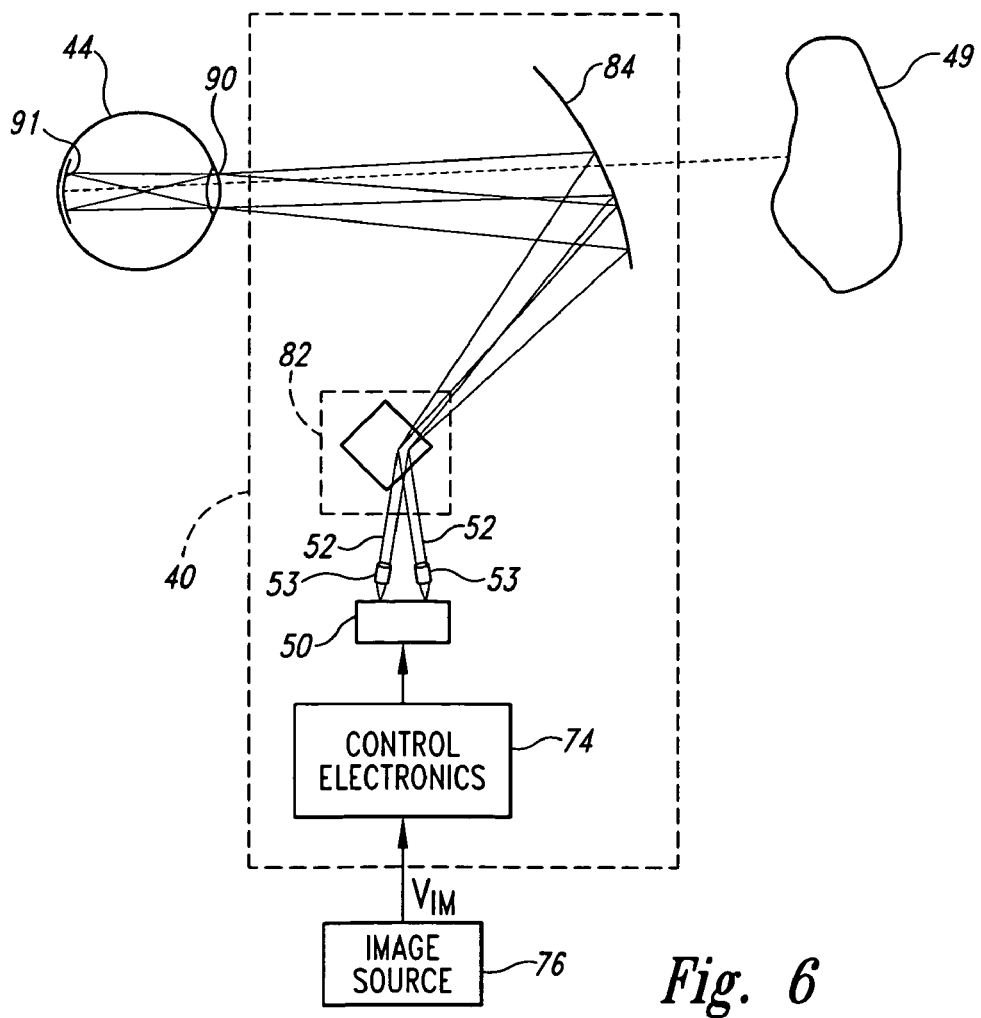
FIG. 6 is a diagrammatic representation of a display according to the one embodiment invention including dual light beams.

As shown in FIG. 6, a scanned beam display 40 according to one embodiment of the invention is positioned for viewing by a viewer's eye 44. While the display 40 is presented herein as scanning light into the eye 44, the structures and concepts described herein can also be applied to other types of displays, such as projection displays that include viewing screens, as well as other types of scanning apparatuses.

The display 40 includes four principal portions, each of which will be described in greater detail below. First, control electronics 74 provide electrical signals that control operation of the display 40 in response to an image signal $V_{IM}$ from an image source 76, such as a computer, television receiver, videocassette player, DVD player, remote sensor, or similar device.

The second portion of the display 40 is a light source 50 that outputs modulated light beams 52, each having a modulation corresponding to information in the image signal $V_{IM}$. The light source 50 may utilize coherent light emitters, such as laser diodes or microlasers, or may use non-coherent sources such as light emitting diodes. Also, the light source 50 may include directly modulated light emitters such as light emitting diodes (LEDs) or may include continuous light emitters indirectly modulated by external modulators, such as acousto-optic or electro-optic modulators.

The third portion of the display 40 is a scanning assembly 82 that scans the modulated beams 52 through two-dimensional scanning patterns, such as raster patterns. The scanning assembly 82 preferably includes a periodically scanning mirror or mirrors as will be described in greater detail below.

Lenses 84 and 53, positioned on opposite sides of the scanning assembly 82 act as imaging optics that form the fourth portion of the display 40. The lenses 53 are, in the exemplary embodiment of FIG. 5, cylindrical graded index (GRIN) lenses that gather and shape light from the light source 50. Where the light source 50 includes optical fibers that feed the lenses 53, the lenses 53 may be bonded to or integral to the fibers. Alternatively, other types of lenses, such as doublets, triplets, or more complex solid optical components, may form the lenses 53. Also, other types of optical elements such as diffractive elements or microlens arrays may be used to shape and guide the light. Regardless of the type of element, the overall optical train may incorporate polarization sensitive materials, chromatic correction, or any other optical technique for controlling the shape, phase, reflection, or other characteristics of the light. Moreover, although the embodiment of FIG. 6 shows two beams 52 feeding the scanning assembly 82, a single beam or more than two beams may be used for selected applications.

This embodiment of the lens 84 is formed from a curved, partially transmissive mirror that shapes and focuses the scanned beams 52 approximately for viewing by the eye 44. One skilled in the art will understand that other conventional optics may be suitable for various configurations. After leaving the lens 84, the scanned beams 52 enter the eye 44 through its pupil 90 and strike the retina 91. As each beam of scanned modulated light strikes the retina 91, the viewer perceives a respective portion of the image as will be described below.

Because the lens 84 is partially transmissive, the lens 84 combines the light from the scanning assembly 82 with the light received from a background 49 to produce a combined input to the viewer's eye 44. Although the background 49 is presented herein as a "real-world" background, the background light may be occluded or may be produced by another light source of the same or different type. One skilled in the art will recognize that a variety of other optical elements may replace or supplement the lenses 84 and/or 53. For example, diffractive elements such as Fresnel lenses may replace either or both of the lenses 84 and 53. Additionally, a beamsplitter and lens, as shown in the embodiment of FIG. 1, may replace the partially transmissive mirror structure of the lens 84. Moreover, various other optical elements, such as polarizers, color filters, exit pupil expanders, chromatic correction elements, eye-tracking elements, and background masks may also be incorporated for certain applications.

Figure 7:
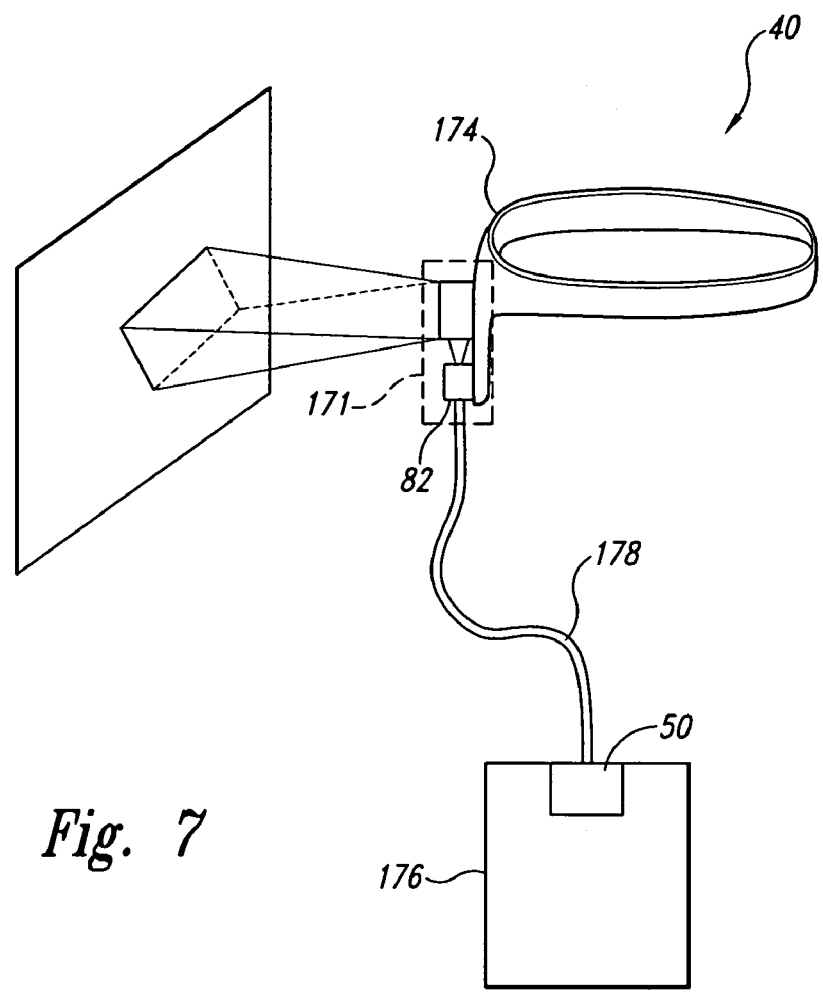
FIG. 7 is an isometric view of a head-mounted scanner including a tether.

Although the elements of FIG. 6 are presented diagrammatically, one skilled in the art will recognize that the components are typically sized and configured for the desired application. For example, where the display 40 is intended as a mobile personal display, the components are sized and configured for mounting to a helmet or similar frame as a head-mounted display 40, as shown in FIG. 7. In this embodiment, a first portion 171 of the display 40 is mounted to a head-borne frame 174 and a second portion 176 is carried separately, for example in a hip belt. The portions 174 and 176 are linked by a fiber optic and electronic tether 178 that carries optical and electronic signals from the second portion to the first portion. One or more beams of light (not shown) are emitted from the end of the tether 178 to impinge upon the scanning assembly 82. One example is shown diagrammatically in FIG. 3. An example of a fiber-coupled scanner display is also found in U.S. Pat. No. 6,140,979 of Gerhard et al., entitled SCANNED DISPLAY WITH PINCH, TIMING, AND DISTORTION CORRECTION, which is incorporated herein by reference.

An exemplary embodiment of the scanning assembly 82 will be described next with reference to FIGS. 8, 9A–B, and 10. The scanning assembly 82 includes several components that correspond to the scanning source 42 of FIGS. 1 and 3. Only central rays 52 are presented for the beams 52 for clarity of presentation.

In this embodiment, a pair of fibers 50 emit light from the light sources (not shown) and the lens 84 is represented as a common refractive lens rather than as a partially transmissive mirror. The scanning assembly 82 includes an active correction mirror 100 that can pivot to scan the light beam 52 along the vertical axis. The correction mirror 100 produces a varying corrective shift along the vertical axis during each sweep (forward or reverse) of the horizontal scanner 56. The corrective shift offsets vertical movement of the beams 52 caused by the vertical scanner 58 to reduce the overall deviation of the scanning pattern from the desired pattern shown in broken lines 70 in FIG. 5.

Before describing the effects of the correction mirror 100 and the relative timing of the various signals, exemplary embodiments of MEMS scanners 200, 220 suitable for use as the horizontal scanner 56 and vertical scanner 58 will be described with reference to FIGS. 9A–B and 10.

Figure 9A:
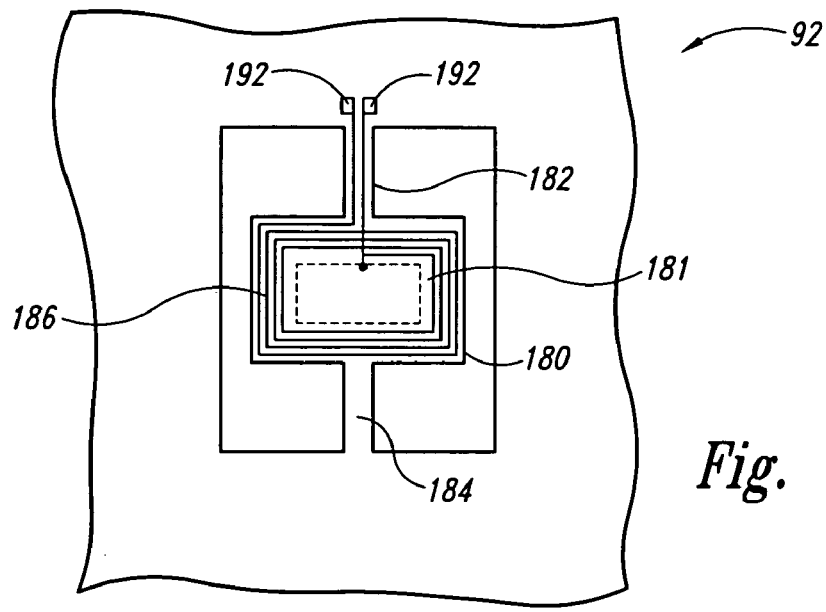
FIG. 9A is a plan view of a dual drive horizontal MEMS scanner suitable for use in the scanning assembly of FIG. 8.
Figure 9B:
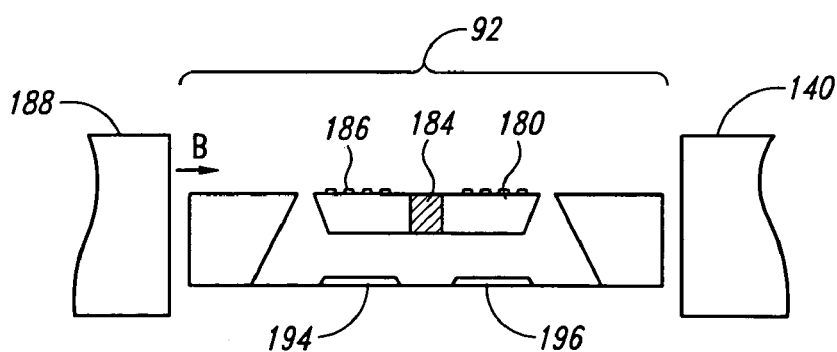
FIG. 9B is a side cross sectional view of the horizontal MEMS scanner of FIG. 9A, showing a second set of actuators embodied as a pair of electrostatic drive pads.

As shown in FIGS. 9A–B, a single axis MEMS scanner formed on a MEMS die 92 includes a scan plate 180 supported by axially aligned torsion arms 182 and 184. The scan plate 180 and torsion arms 182 and 184 are integrally formed in silicon and are dimensioned to produce a desired resonant frequency. For typical imaging applications, the resonant frequency is on the order of 1000 to 30,000 Hz.

The scan plate 180 carries a mirror 181 and a conductive coil 186 that is electrically isolated from the plate 180. As best seen in FIG. 9B, a pair of magnets 188 and 190 produce a B-field that extends across the coil 186. Applying an electrical signal at pads 192 produces current in the coil 186 that interacts with the B-field to produce torque about the torsion arms 182 and 184. As will be described below, for some applications, the coil 186 is electrically isolated from the scan plate 180, typically by an insulating layer such as silicon dioxide formed therebetween. For simplicity of presentation, the silicon dioxide layer is omitted from FIG. 9B.

A pair of capacitor plate electrodes 194 and 196 are positioned beneath the scan plate 180, on opposite sides of the torsion arms 182 and 184. When one or both of the electrodes 194 and 196 is driven at a voltage relative to the scan plate 180, the resulting electric fields produce forces on the scan plate 180. The electric field induced force produces rotation of the scan plate 180 about the torsion arms 182 and 184.

If both the coil 186 and electrodes 194 and 196 are driven synchronously, the resulting force about the torsion arms 182 and 184 will be the combination of the magnetically-induced force and the electrostatically-induced force.

Figure 10:
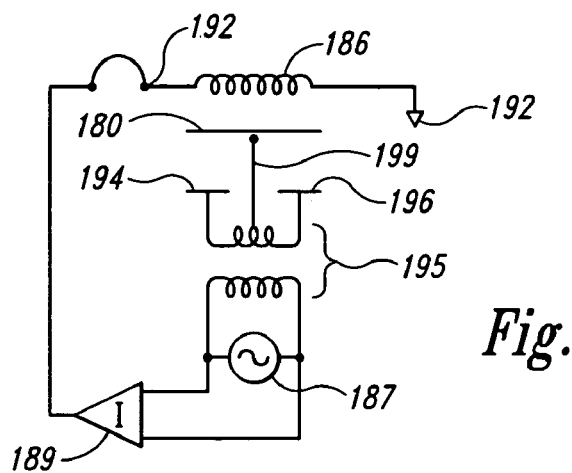
FIG. 10 is as diagrammatic representation of a dual-drive scanner and driving electronics.

One approach to applying current to the coil 186 and a voltage to the electrodes 194 and 196 is presented diagrammatically in FIG. 10, where an input signal source 187 drives an amplifier 189 at a first of the pads 192 to provide current to the coil 186. The second pad 192 is grounded to provide a return path for current.

A transformer 195 couples the signal from the input signal source 187 to the electrodes 194 and 196 to produce a differential voltage between the electrodes. A center tap 199 references the scan plate 180 to the transformer 195 so that the transformer output produces voltage differentials between each of the plate electrodes 194, 196 and the scan plate 180. One skilled in the art will recognize that the simple diagrammatic structure of FIG. 10 may be modified easily to optimize performance. For example, it may be desirable in some applications to add phase control circuitry or to provide a return path for current that is not referenced to ground.

In another embodiment of a MEMS die 92, magnetic and staggered comb drives combine to provide driving force to drive a MEMS component, as is shown in FIG. 11. In this embodiment, respective sets of moving teeth 1102 project axially from a scan plate 180 carried by respective torsion arms 182 and 184. The moving teeth 1102 are interleaved with corresponding sets of fixed teeth 1108 that project from a substrate 1110. The moving teeth 1102 may be formed as described in WIPO patent application number WO0025170A1, by Schenk et al., entitled MICROMECHANICAL COMPONENT COMPRISING AN OSCILLATING BODY, hereby incorporated by reference.

The sets of comb drives are staggered in that the moving teeth 1102 are slightly vertically offset from the fixed teeth 1108. When a voltage is applied between resting sets of teeth 1102 and 1108, the resulting field produces a substantially vertical force between the sets of teeth 1102 and 1108. The force produces rotation of the scan plate 180. The moving teeth 1102 in the embodiment of FIG. 11 are positioned above the fixed teeth 1108 in their resting positions, to allow additional clearance for the scan plate and moving teeth 1102 to swing without striking a support plate 1112. However, where clearance concerns are less significant, the moving teeth 1102 may be below the fixed teeth 1108.

As shown in FIG. 11, the electrostatic comb drive described above is combined with a magnetic drive that includes a magnetic drive coil 186. The magnetic drive and comb drive may be driven synchronously to provide an additive drive force in a manner analogous to the additive effects of the magnetic drive and electrostatic drive of FIGS. 9A and 9B. Insofar as the drive phase of a comb drive may differ from that of the electrostatic pads of FIGS. 9A and 9B, a phase offset should be provided between the comb drive and the magnetic drive.

Figure 12:
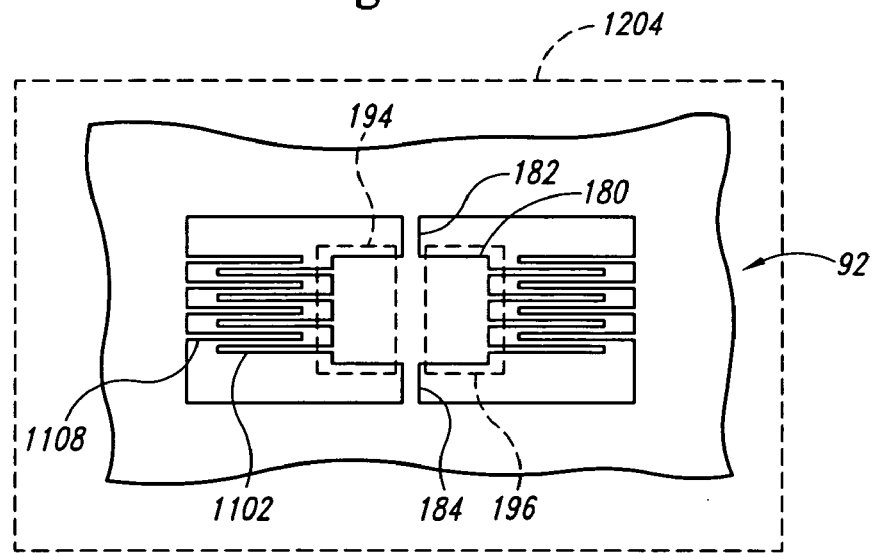
FIG. 12 is a diagrammatic view of an alternative dual drive MEMS scanner incorporating comb-drive and capacitive plate electrostatic drive elements.

While two embodiments of a MEMS scanner incorporating a plurality of driving force techniques have been described with reference to FIGS. 9A–B, 10, and 11, other combinations may be within the scope of the invention. For example, the comb drive approach may be combined with the electrostatic pad drive approach, as shown in FIG. 12. The MEMS die 92 includes comb drives with fixed and moving teeth 1102, 1108 that operate as described previously. Additionally, a pair of drive electrodes 194 and 196 are situated beneath the scan plate 180, on a supporting substrate 1204. Here, the MEMS die 92 and supporting substrate 1204 form a stationary base and torsion arms 182 and 184 form an axis around which scan plate 180 may rotate in relation to the base. The base is, in turn, fastened to other portions of a mechanism.

The drive electrodes 194 and 196 are positioned on opposite sides of the torsion arms and aligned to produce electric fields that extend between the drive electrodes and respective sections of the scan plate 180. When a voltage is applied between a drive electrode and its respective scan plate section, the electric field produces a force extending between the drive electrode and the respective scan plate section. Because the drive electrodes 194 and 196 are substantially fixed and the scan plate 180 is supported by torsion arms, the force causes the scan plate to rotate about the axis defined by the torsion arms.

By synchronizing the voltage applied to the drive electrodes 194 and 196 with the voltage applied between the moving and fixed teeth 1102 and 1108, the electrostatic forces from the drive electrodes 1202 and the teeth 1102, 1108 act together to produce rotation of the scan plate 180 about the axis defined by the torsion arms.

While some teeth electrodes are offset to ease initialization of motion, this structure is not required. Asymmetry in the structure is typically adequate for initiating oscillation. Alternatively, additional drive may help to initiate the motion. For example, in the configuration of FIG. 12, the drive electrodes 194 and 196 can provide force to rotate the scan plate 180 slightly, thereby offsetting the teeth 1102 and 1108. Once the teeth 1102 and 1108 are offset, electric fields between the teeth 1102 and 1108 provide a primary angular component to produce rotation of the scan plate 180. This may be a desirable approach in single crystal silicon or other bulk systems where initialization of movement of the scan plate 180 may be more difficult. Use of the electrostatic pads 194 and 196 to initiate asymmetry may also be used to eliminate the need to offset respective teeth 1102 and 1108, thereby simplifying fabrication of the device.

Figure 13:
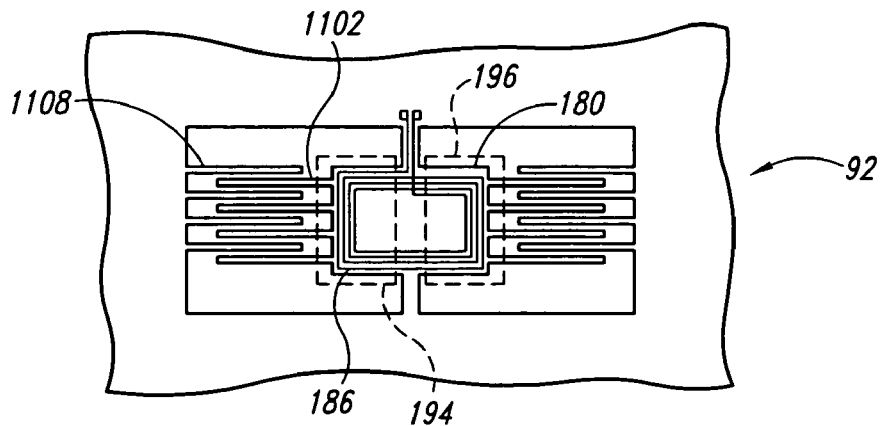
FIG. 13 is a diagrammatic view of another alternative MEMS scanner incorporating three actuators, capacitive plate electrostatic, comb-drive electrostatic, and moving coil magnetic.

Although the embodiments described herein incorporate a combination of two drive techniques in a single device, more than two drive techniques may be applied in some configurations. For example, the magnetic coil approach may be combined with both a comb drive and drive electrodes, as shown in FIG. 13. In this approach, fixed and moving teeth 1102 and 1108, drive electrodes 194 and 196, and the coil 186 work together to cause the scan plate 180 to rotate.

Moreover, although combinations of comb, magnetic, magnetic coil, and drive electrode approaches are described herein, other approaches to activating moving MEMS components, such as thermal drives, piezoelectric drives, gear drives or other known approaches, may be within the scope of the invention. Additionally, while the plurality of drive approach has been described herein with respect to a MEMS optical scanner, the approach may be applied to other MEMS components, such as gyroscopes, valves, switches, or other devices.

As mentioned above, although the comb drive described herein employs offset or staggered combs, the invention is not so limited. Where the comb drive is combined with a second drive, such as an electrostatic, magnetic, or alternative drive, the second drive can initiate rotation. Once the mirror begins rotating, the combs are no longer coplanar and a voltage between the combs will generate rotational force. This approach may be particularly useful for applications where the complexity of forming a staggered comb is undesirable. Additionally, this approach may be useful in reducing undesirable modes caused by vertical components of force vectors that result from staggering of the combs.

While the MEMS scanners shown and discussed above describe, for purposes of simplicity, single-axis embodiments, the approach may also be applied to multi-axis scanners. Multi-axis scanners are discussed in more detail below.

Each of the MEMS scanners described herein is typically fabricated in silicon according to known semiconductor processing techniques. Various approaches to such devices include known processing approaches such as bulk micromachining, surface micromachining, SOI, or combinations of such processing approaches. Some such approaches are described in U.S. Pat. No. 5,648,618 to Neukermans et al., entitled MICROMACHINED HINGE HAVING AN INTEGRAL TORSIONAL SENSOR, which is incorporated herein by reference. As described therein torsional movement of a MEMS scanner can produce electrical outputs from integrated piezoresistors that correspond to the position of the scanning mirror. Alternatively, the position of the mirror may be obtained by mounting piezoelectric sensors to the scanner, as described in U.S. Pat. No. 5,694,237 to Melville, entitled POSITION DETECTION OF MECHANICAL RESONANT SCANNER MIRROR, which is incorporated herein by reference. Some configurations may omit the position sensing or may use other approaches to detecting a scanning position, such as optically detecting a beam position.

Figure 8:
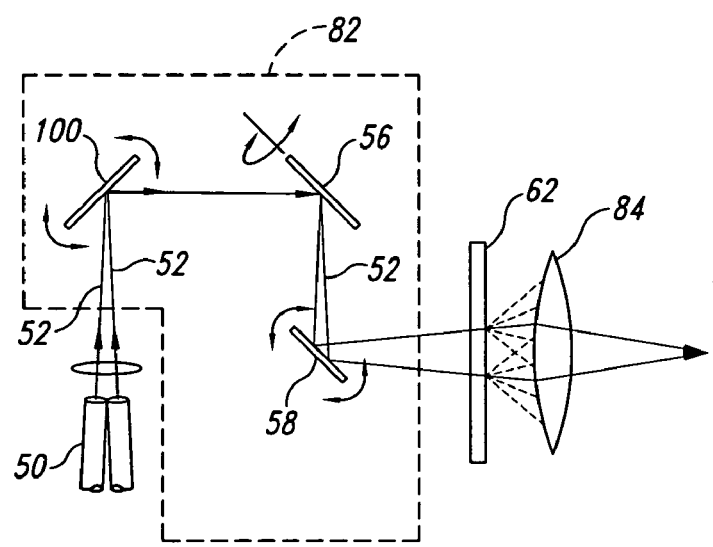
FIG. 8 is a diagrammatic representation of a scanning assembly within the scanning display of FIG. 6, including a correction mirror.

Returning to the description of resonant optical scanning with reference to FIGS. 8 and 9A–B, if the frequency and phase of the electric signals are properly synchronized with the movement of the scan plate 180, the scan plate 180 oscillates at its resonant frequency with little power consumption.

The vertical scanner 58 is a discrete, commercially available galvanometric scanner. Because the rate of oscillation is much lower for vertical scanning, the vertical scanner 58 is typically not resonant. The vertical scanner 58 receives light from the horizontal scanner 56 and produces vertical deflection at about 30–100 Hz. Because the vertical scanner 58 typically operates at a lower frequency than the horizontal scanner 56, the vertical scanner 58 may include a scan plate and mirror that are significantly larger than the mirror 181, thereby reducing constraints on the positioning of the vertical scanner 58.

While the previously described embodiment employs a commercially available galvano-scanner, a MEMS scanner may form the vertical scanner. The MEMS vertical scanner may use a single form of drive, such as magnetic, electrostatic, or comb drive. Alternatively, the MEMS vertical scanner may an employ a dual or multiple mode drive approach similar to those described with respect to the scanner of FIGS. 9A–B, 10–13. While separate vertical and horizontal scanners have been described above, other scanners, such as biaxial scanners may be within the scope of the invention, as will be described below.

Returning to FIGS. 6 and 8, the light sources 50 output light beams 52 that are modulated according to the image signal from the control electronics 74. The modulated beams of light strike the oscillating horizontal mirror 181 (of the horizontal scanner 56), and are deflected horizontally by an angle corresponding to the instantaneous angle of the mirror 181.

The deflected beams then strike the vertical scanner 58 and are deflected at a vertical angle corresponding to the instantaneous angle of the vertical scanner 58. After expansion by the beam expander 62, the beams 52 pass through the lens 84 to the eye. As will also be described below, the modulation of the optical beams is synchronized with the horizontal and vertical scans so that, at each position of the mirrors, the beam color and intensity correspond to a desired virtual image. Each beam therefore "draws" a portion of the virtual image directly upon the user's retina.

In some applications, an exit pupil expander may be used or may be replaced or supplemented by an eye tracking system. Where an exit pupil expander is used it may have a variety of structures, including diffractive or refractive designs, including microlens arrays. For example, the exit pupil expander may be a planar or curved structure and may create any number or pattern of output beams in a variety of patterns. According to the application, the number of pupils may vary widely. For example, in some applications a 15 by 15 array may be suitable.

One skilled in the art will recognize that several components of the scanning assembly 82 have been omitted from the FIG. 8 for clarity of presentation. For example, the horizontal and vertical scanners 56 and 58 are typically mounted to a frame. Additionally, lenses and other optical components for gathering, shaping, turning, focusing, or collimating the beams 52 have been omitted. Also, no relay optics are shown between the scanners 56 and 58, although these may be desirable in some embodiments.

Turning now to the magnetic coil and fixed magnet driving structure, the design of the coil 186 that populates the surface of the MEMS scanner is done so within a variety of constraints; namely, lithographic electroplating guidelines, coil power dissipation, overall system power, drive waveform, driver circuitry, video rates, and of course the scanner die size. Using lithographic electroplating coil deposition methods, the parameters that can be adjusted to satisfy such requirements are material properties, overall patterning, coil trace width, trace pitch, and deposit thickness. To this end an analytical model is assembled in order to vary these parameters within the design space. Coil density, resistivity, thermal properties, and fabrication process are important criteria in coil material selection. Gold and copper are commonly used as coil materials. For some applications, copper is preferred over gold due to its lower resistivity ($\rho$) and lower density.

The model is based on the integration of the Lorentz force over the whole MEMS coil and spatial magnetic field. Assuming no applied electric field, the time dependent torque $\Gamma(t)$ of a conductor having some current distribution J(t) rotated about vector r and immersed in a static magnetic flux B(r) is expressed as:

$$\Gamma(t) = \iiint r \times (J(t) \times B(r)) d^3 r$$

Figure 14:
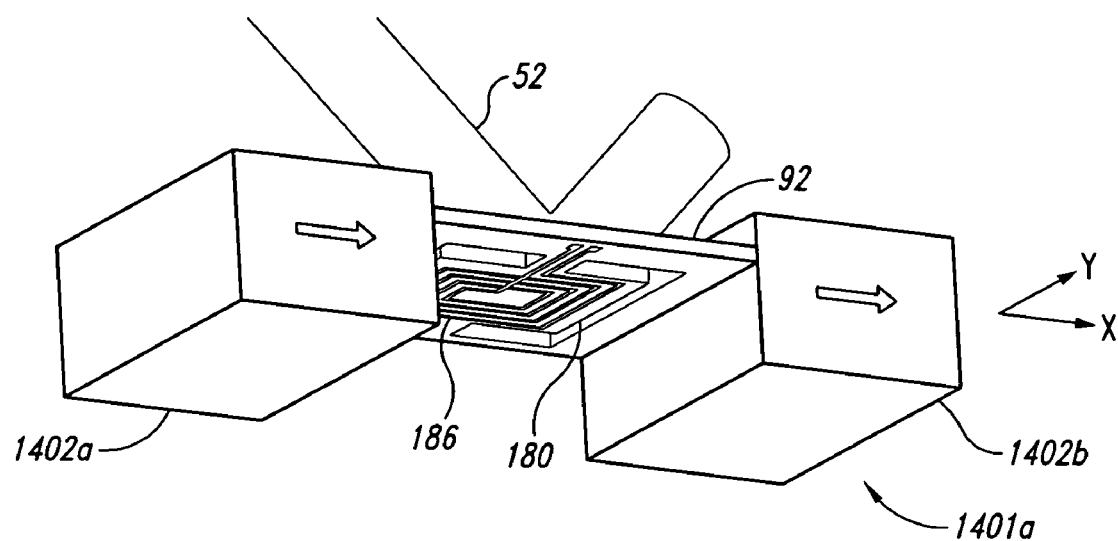
FIG. 14 is a representation of a general configuration of a torsional scanner with coils and magnets for a moving-coil actuator.

For many MEMS scanner designs, the geometry for this problem may be dramatically simplified. A MEMS scanner 1401 is depicted in FIG. 14. A rectangular coil 186 populates the surface of a rectangular scan plate 180. The coil has a given height h in the $\hat{y}$ direction and width w in the $\hat{x}$ direction. The coil has a minimum interior exclusion zone within the scan plate of dimension 2p in the horizontal direction (that is the distance between the innermost coil segments in the horizontal direction). The coil also has a maximum exterior border zone between the outermost coil segment and the edge of the scan plate 180 defined by a width o, which surrounds the perimeter of the scan plate. The whole scanner in immersed in an approximately uniform magnetic flux in the $\hat{x}$ direction of magnitude $B_y$ provided by fixed magnets 1402a and 1402b polled as indicated. Here, the vertical axis $\hat{y}$ is defined as the axis around which the scan plate 180 rotates. The horizontal axis $\hat{x}$ is orthogonal to the vertical axis and in the nominal plane of the device.

In this configuration to good approximation, only conductor traces perpendicular to $B_y\hat{y}$ contribute to the net torque. These individual trace lengths (carrying a given current i) are denoted with the vector $\vec{L}_j$ (all having direction perpendicular to $B_y\hat{y}$). The magnetic force on this individual coil trace is $\vec{F}_j = i\vec{L}_j \times B_y\hat{y}$. If $\vec{r}_j$ is the vector whose length is from the axis of rotation to a given conductor trace, and whose direction is always perpendicular to the axis of rotation; by symmetry, the torque contribution of the conductor trace for small angular deflections is:

$$\vec{\Gamma}_j = \vec{r}_j \times \vec{F}_j = \vec{r}_j \times (i\vec{L}_j \times B_y\hat{y}) = iB_y(r_jL_j)$$

Thus the total torque will be:

$$\Gamma_{total} = \sum_{j=1}^{N} \Gamma_j = iB_y \sum_{j=1}^{N} r_j L_j = iB_y M$$

Here M is identified as the total moment of the coil, defined as the sum of all the $r_jL_j$ products.

The torque required to reach a given maximum mechanical scan angle $\Theta_{mech}$ is determined by the torsional Hooke's law rate constant $K_f$. For MEMS scanners, such mechanical properties are accurately determined using finite element analysis (FEA) methods applied to the entire flexure-scan plate-coil ensemble. The required peak current to reach $\Theta_{mech}$ can be calculated by equating the Lorentz torque $\Gamma_{total}$ to the required mechanical torque to reach $\Theta_{mech}$, i.e. by setting $\Gamma_{total} = K_f\Theta_{mech}$. This leads to:

$$i_{peak} = \frac{K_f \theta_{mech}}{|H(f)|B_y \sum_{j=1}^{N} r_j L_j} = \frac{K_f \theta_{mech}}{|H(f)|B_y M}$$

Within the factor M lies the parameterized quantities which determine the coil geometry for the given design space. This will be described below. Included in this expression is H(f), the mechanical response amplitude for the operational waveform. This term accounts for all the Fourier components that comprise the synthesized waveform, which in turn produces the desired scan trajectory of beam 52. For simple resonance operation, H(f) is equal to the Q-factor and for low frequency operation (near static load conditions) H(f) is unity.

Determination of the total average power dissipated in the coil, $P_{ave} = i_{peak}^2 R_{coil}$, also requires a resistance calculation, which is also parameterized by the geometry of the coil. The variable parameters available for the coil layout are the trace width b, their pitch (a+b), and the trace deposit thickness c. The task at hand is to optimize these values within a given design space. Using these values (a, b, and c) the following analytical relations have been derived to calculate the scanner performance as a function of their variation.

The number of coils available for a given plate is:

$$N = trunc\left[\frac{\frac{h}{2} - p - o}{(a+b)}\right]$$

The resistance $$R_{coil} = \rho \frac{\lambda}{bc}$$

required is determined using the length:

$$\lambda = \sum_{n=1}^{2N} w + h - 4o - (2n+1)a - (2n-1)b$$

The total coil moment M is calculated from:

$$M = \left[\frac{h-b}{2} - o - a\right][2(w-2o) - 3a] +$$
$$\sum_{n=2}^{N} \left[\frac{h}{2} - o - na - \frac{2n-1}{2}b\right][2(w-2o) - (4n+1)a - (4n-5)b]$$

Using torsional constant figures K from FEA and magnetic flux values $B_y$ from both FEA and measurement, such expressions have proven successful in predicting the current and power requirements for MEMS scanners as a function of the coil geometry characteristics.

A resonant single-axis scanner, such as in the configuration of scanner 100 of FIG. 8, may be used as a raster pinch correction scanner as described by H. Urey, F. DeWitt, P. Lopez, and J. Tauscher; in MEMS Sinusoidal Raster Correction Scanner for SXGA Retinal Scanning Display," MOEMS Display and Imaging Systems, Proc. SPIE Vol. 4985, San Jose, Calif., January 2003, hereby incorporated by reference and as described by H. Urey, F. DeWitt, K. Powell, and M. Bayer; in "High-Frequency Raster Pinch Correction Scanner for Retinal Scanning Displays," MOEMS and Miniaturized Systems, SPIE Vol. 4561, San Francisco, Calif., October 2001; also hereby incorporated by reference.

Figure 15A:
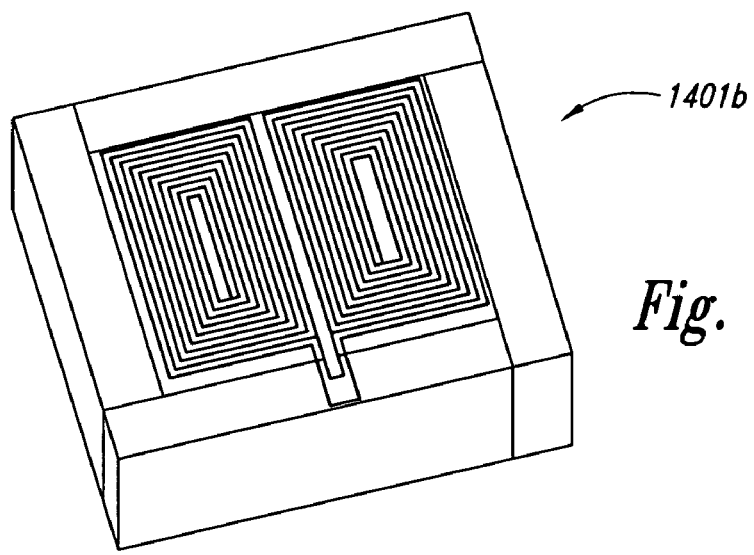
FIG. 15A is a bottom view of a counter-wound coil push-pull actuator on a MEMS scanner.
Figure 15B:
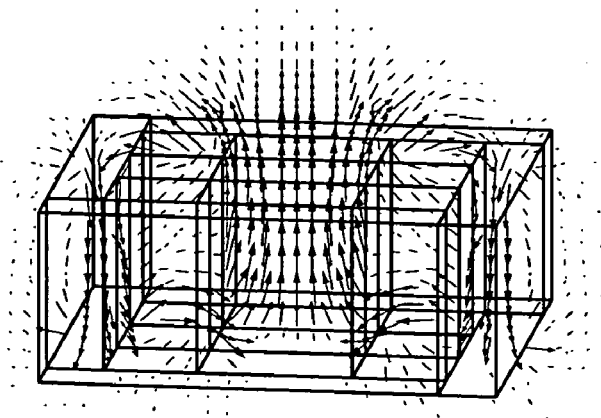
FIG. 15B shows magnetic field lines for a magnet design for the MEMS device of FIG. 15A. The B-field strength along the direction perpendicular to the coil current is in the 0.5–0.7 Tesla range.

Although a configuration 1401*a* similar to that of FIG. 14 is one approach, it is relatively big compared to desired package sizes. FIG. 15A shows a MEMS scanner 1401*b* that has a two-coil architecture and corresponding magnet design developed for a raster pinch correction scanner. The magnetic flux lines are as shown in FIG. 15B. The top portion of FIG. 16 shows magnetic field strength determined by FEA.

Figure 16:
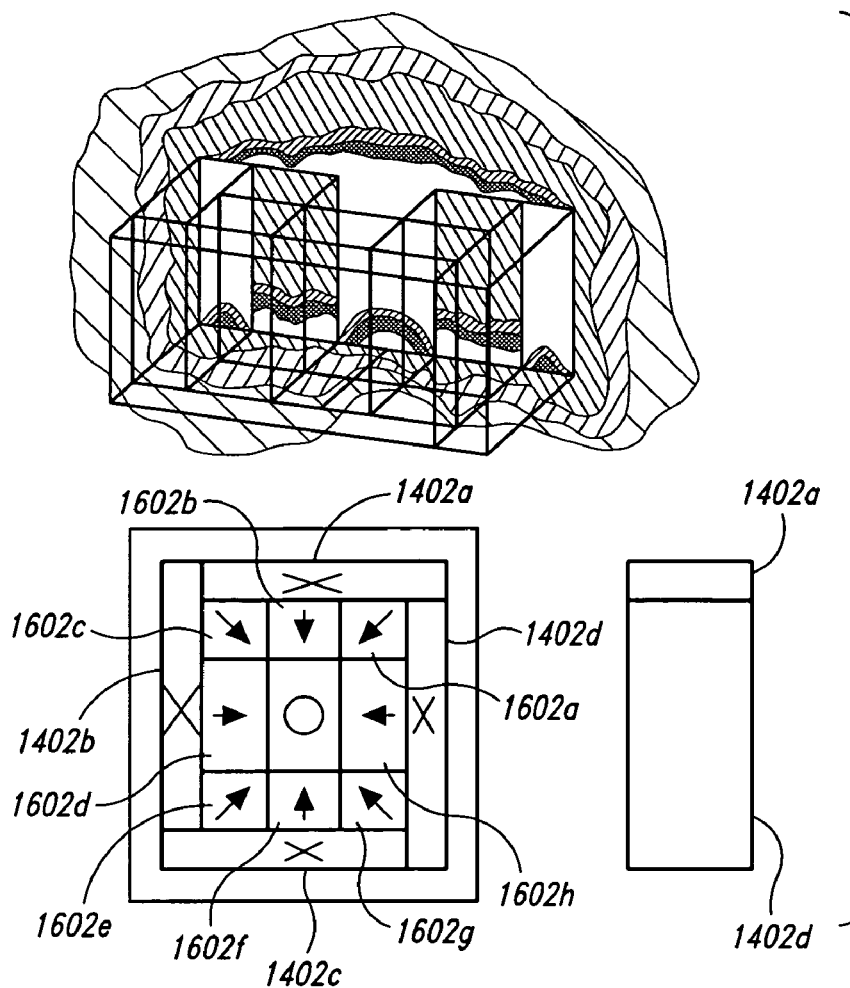
FIG. 16 is a diagrammatic representation of a compact magnet design for the dual-coil MEMS actuator of FIGS.

The lower portion of FIG. 16 shows additional detail of the magnet design. Main magnets 1402*a*–*d* are shown ringing the scanner volume. Main magnets 1402*a*–*d*, as indicated by the X's shown thereon, are polled in a direction that extends down, normal to the plane of the figure and normal to the nominal plane of the scanner plate. Small magnets 1602*a*–1602*h* placed underneath the coil. These small magnets help to focus the magnetic field and maximize its strength at the actuator coils.

The design of FIGS. 15*a*–16 provides large fringing fields and allows utilization of all four sides of the coil for generating torque. This design improved the torque while substantially reducing the scanner volume. The reduction in scanner volume is illustrated in FIG. 17 where the "push-pull" embodiment 1401*b* is compared to the size of a more conventional transverse field embodiment 1401*a*.

Figure 3:
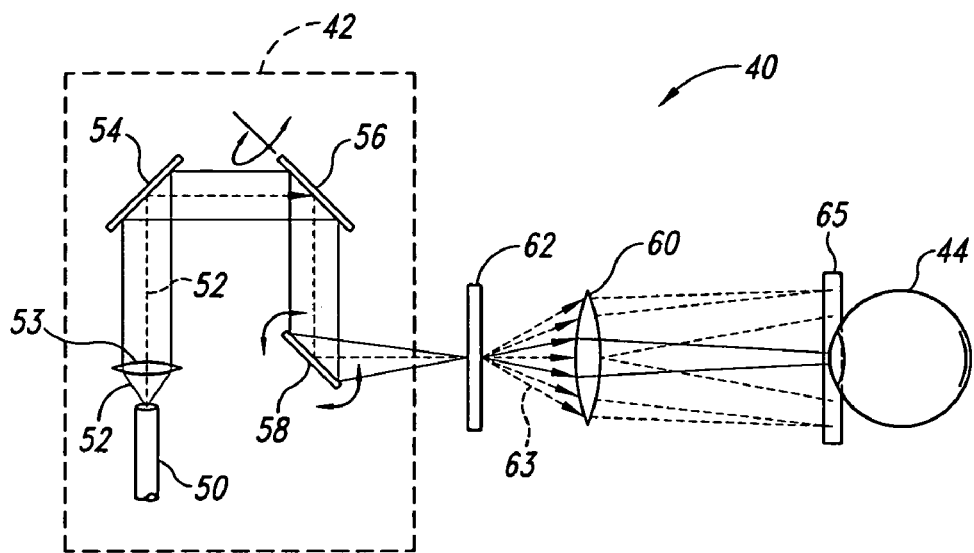
FIG. 3 is a diagrammatic representation of a scanner and a user's eye showing bi-directional scanning of a beam and coupling to the viewer's eye.

Although described as applied to a correction scanner 100 such as that of FIG. 8, the design of push-pull MEMS scanner 1401*b* of FIGS. 15*a* through 17 may be alternatively applied to other applications including a horizontal scanner 56 or a vertical scanner 58 such as those shown in FIGS. 3 and 8. Alternatively, the design may be applied to other types of devices. Finally, as will be appreciated from the discussion below, the push-pull moving coil magnetic drive MEMS scanner 1401*b* may be applied to biaxial scanning.

One commercially available scanning display system uses a bi-axial gimbal-mounted MEMS scanner and a synchronized light source to generate a raster pattern of the display. The horizontal scanner operates at high frequency (19 kHz for SVGA resolution), and can be a high-Q resonant device that consumes little power. Because the device can operate with a low actuation force, electrostatic actuation is adequate for the horizontal scanner. However, in a raster-scanning pattern, the vertical scan frame operates non-resonantly with a ramp waveform at the desired display frame rate (typically 60 Hz). The vertical scan frame surrounds and supports the horizontal scanning mirror and is thus inherently larger. Magnetic actuation provides a large force that produces a large vertical deflection for the vertical frame.

FIG. 18 shows the configuration of MEMS die 92 and magnets for a commercially available personal display system. Two side magnets 1402*a* and 1402*b* with the same magnetization direction, indicated by arrows, are positioned on opposite sides of the vertical frame above a bottom magnet 1602 with an opposite magnetization direction. For a high B-field the magnets are all made of NdFeB. The bottom magnet (1) keeps the magnetic field flat in the MEMS die plane to prevent unwanted scanner motion, and (2) generates a uniform Bx field across the driving coils. FIG. 19 shows FEA results for the design of FIG. 18 by Ansoft Maxwell®. The modeled values of average Bx and Bz are 0.39 Tesla and −0.004 Tesla, respectively, while the average B measured for 8 actual assemblies was 0.38 Tesla. The moving coil actuator functions with a power dissipation of ~200 mW.

In a manner analogous to the diagram of FIG. 16, main magnets 1402 act as the main B field generators while auxiliary magnet(s) 1402 act to shape the B field. In each case, magnet(s) 1402 serve to focus the magnetic flux across the moving coil actuators, thus providing greater drive efficiency and torque, and allowing reduced coil size.

While the magnet design of FIG. 18 conformed to the design predictions, next generation wearable displays require even further size and power consumption reductions. One opportunity to reduce product size is a reduction in magnet size. The two side magnets 1402*a,b* add an additional ~80 mm² footprint in the x-y plane to the ~90 mm² die 92.

A top-and-bottom magnet configuration for MEMS actuators minimizes the total packaging size and simplifies the packaging procedure. As shown in FIG. 20, two magnets 1402*a* and 1402*b* are located above the plane of MEMS die 92, which includes drive coils 186 (not shown), and another two magnets 1402*c* and 1402*d* below the plane. The upper two magnets 1402*a* and 1402*b* are also chamfered to create clearance for the input and output optical beams. FIG. 21 shows the FEA result for the B vector, which reaches substantially the same magnitude as the side-and-bottom magnet embodiment of FIG. 19. Compared to the embodiment of FIG. 19, the total magnet volume is reduced by about 60%, and the magnet footprint is superimposed with that of the MEMS die itself, all without reducing the effective magnetic field. This smaller magnet embodiment led to a reduction of the MEMS packaging size of up to about 70%. Prototypes of the magnet embodiment of FIG. 20, with the same MEMS die embodiment as that of FIG. 19, functioned at the same power dissipation level, and met other system requirements.

Turning to FIGS. 22 and 23, the effect of the plurality of beams 52 will now be described. As is visible in FIG. 22, two fibers 50 emit respective light beams 80. The GRIN lenses 53 gather and focus the beams 80 such that the beams 80 become converging beams 52 that strike a common mirror 181 of a bidirectional scanner 1090.

For clarity of presentation, the embodiment of FIG. 22 eliminates the mirror 84, as is desirable in some applications. Also, the embodiments of FIGS. 22 and 23 include a single mirror 181 that scans biaxially instead of the multiple mirror structure of scanning assembly 82 shown in FIGS. 3 and 9. Such a biaxial structure is described above in greater detail below with reference to FIGS. 23 and 28. One skilled in the art will recognize that a dual mirror system may also be used, though such a system would typically involve a more complex set of ray traces and more complex compensation for differing optical path lengths.

Also, although the fibers 50 and lenses 84 of FIG. 22 appear positioned in a common plane with the scanning mirror 181, in many applications, it may be desirable to position the fibers 50 and lenses 84 off-axis, as is visible in FIG. 23. Moreover, where four fiber/lens pairs are used, as in FIG. 23, a beam splitter or other optical elements can allow the fiber/lens pairs to be positioned where they do not block beams 52A–D from other fiber/lens pairs. Alternatively, other approaches, such as small turning mirrors can permit repositioning of the fiber/lens pairs in non-blocking positions with little effect on the image quality.

After exiting the lens 53, the first beam 52A strikes the scanning mirror 181 and is reflected toward an image field 1094. The second beam 52B is also reflected by the scanning mirror 181 toward the image field 1094. As shown by the ray tracing of FIG. 22, the horizontal position of the beams 52A–B in the image field 1094 will be functions of the horizontal angular deflection of the scanner 1090 (and hence the horizontal angular deflection of the mirror surface 181) and the position and orientation of the lens 53 and fiber 50. Similarly, with respect to vertical position, the vertical position of the beams 52 in the image field 1094 will be functions of the vertical angular deflection of the scanner 1090 and the position and orientation of the lens 53 and fiber 50 in the vertical plane.

At the image field 1094, the first beam 52A illuminates a first region 1202A and the second beam 52B illuminates a second region 1202B that has a non-overlapping portion with respect to the first region 1202A. To allow a smooth transition between the two regions 1202A and 1202B, the two regions overlap slightly in a small overlap region 1098. Thus, although the two regions are substantially distinct, the corresponding image portions may be slightly "blended" at the edges.

While only two beams 52A–B are visible in FIG. 22, more than two fiber/lens pairs can be used and the fiber/lens pairs need not be coplanar. For example, as can be seen in FIG. 23, four separate lenses 53 transmit four separate beams 52A–D from four spatially separated locations toward the bidirectional scanner 1090. As shown in FIG. 23, the mirror 181, situated in the bidirectional scanner 1090 (of which MEMS die 92 is a principal component) so as to pivot in two axes, reflects each of the four beams 52A–D to a respective spatially distinct region 1202A–D of the image field 1094. Upper horizontally opposed regions 1202A and 1202B of image field 1094 include a small blending zone 1098 therebetween as do lower horizontally opposed regions 1202C and 1202D. Similarly, a vertical blending zone 1099 is positioned at the vertical overlap between upper tiles 1202A–B and respective lower tiles 1202D–C.

Thus, the four beams 52A–D each illuminate four separate "tiles" 1202A–D that together form an entire image. One skilled in the art will recognize that more than four tiles may form the image. For example, adding a third set of fiber/lens pairs could produce a 2-by-3 tile image or a 3-by-2 tile image. Additionally, tiles need not be precisely horizontally and vertically aligned. For example, it may be advantageous in some applications to arrange horizontal rows offset from one another, akin to a "running bond" bricklaying pattern.

To produce an image, the intensity and color content of each of the beams 52A–D is modulated with image information as the mirror 181 sweeps through a periodic pattern, such as a raster pattern. FIG. 25 shows diagrammatically one embodiment where the beams 52A–D can be modulated in response to an image signal $V_{IM}$ to produce the four tiles 1202A–D.

The image signal $V_{IM}$ drives an A/D converter 1302 that produces corresponding data to drive a demultiplexer 1304. In response to the data and a clock signal CK from the controller 74 (FIG. 6), the demultiplexer 1304 produces four output data streams, where each data stream includes data corresponding to a respective image tile 1202A–D. For example, the demultiplexer 1304 outputs data corresponding to the first half of the first line of the image to a first buffer 1306B and the data corresponding to the second half of the first line to a second buffer 1306A. The demultiplexer 1304 then outputs data corresponding to the second line of the image to the second lines of the first two buffers 1306B and A. After the first two buffers 1306B and 1306A contain data representing the upper half of the image, the demultiplexer 1304 then begins filling third and fourth buffers 1306C and D. Once all of the buffers 1306A–D are full, an output clock CKOUT clocks data simultaneously from all of the buffers 1306A–D to respective D/A converters 1308A–D. The D/A converters 1308A–D then drive respective light sources 50 to produce light that is scanned into the respective regions 2102A–D, as described above. The actual timing of the pixel output is controlled by the output clock CKOUT.

While a basic buffer approach is described herein, other approaches may be applied to control the timing and scanning assemblies described herein. One approach is described in co-pending U.S. Patent Application Ser. No. 60/282,719 of Bright, et al. entitled ELECTRONICALLY SCANNED BEAM DISPLAY filed Apr. 9, 2002, which is commonly assigned herewith and is incorporated herein by reference.

One skilled in the art will recognize that, although the system of FIGS. 23–25 describes four separate regions 1201A–D, a larger or smaller number of regions may be used. Also, where some overlap of the regions 1202A–D is desired, common data can be stored in more than one buffer 1306A–D. Because the sets of common data will duplicate some pixels in the overlapping region, the data may be scaled to limit the intensity to the desired level.

One approach to improving image quality that is helpful in "matching" the image portions 1202A–D to each other will now be described with reference to FIGS. 26 and 27. Because the angle of the beams 52A–D is determined by the angles of the vertical and horizontal scanner (for the uniaxial, two scanner system) or the horizontal and vertical angles of the single mirror (for the biaxial scanner), the actual vector angle of the beams 52A–D at any point in time can then be determined by vector addition. In most cases, the desired vertical portions of the scan patterns will be a "stair step" scan pattern, as shown by the broken line 2602 in FIG. 26.

Figure 4A:
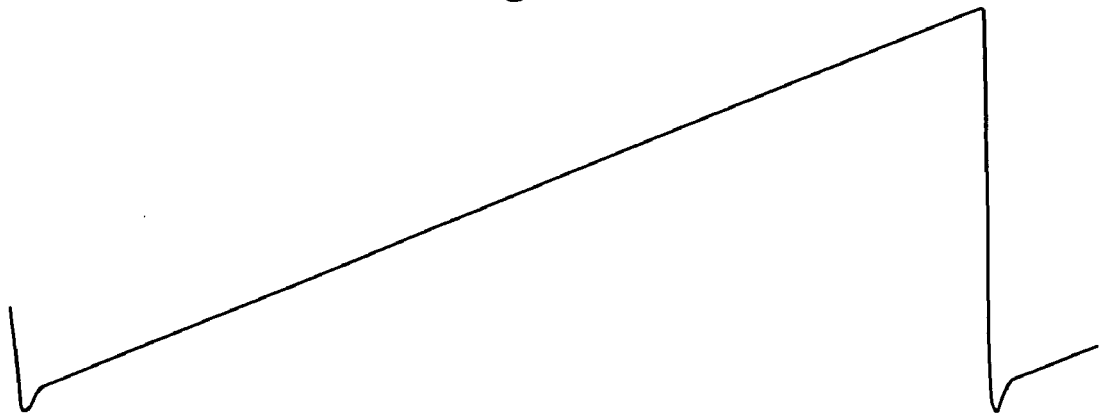
FIG. 4A is a signal-timing diagram of a vertical scan pattern in the scanning assembly of FIG. 3.
Figure 4B:
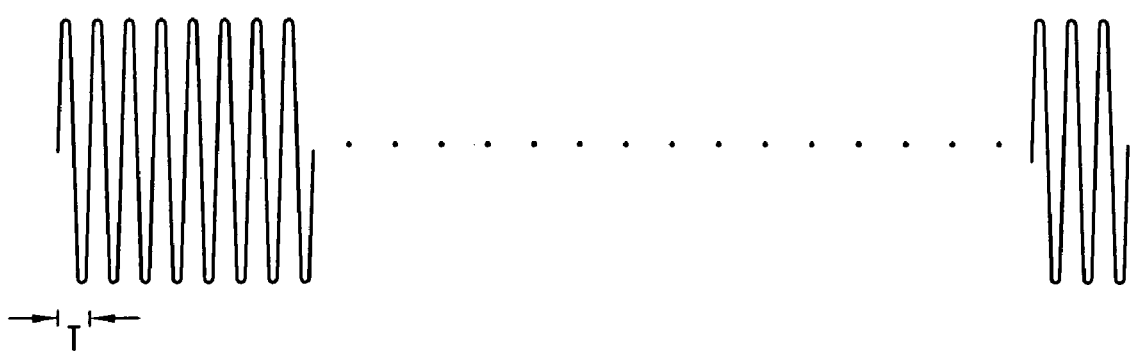
FIG. 4B is a signal-timing diagram of a horizontal scan pattern in the scanning assembly of FIG. 3.

If the active correction mirror 100 (FIG. 8) is disabled, the pattern traced by the ray will be the same as that described above with respect to FIGS. 3–5, namely solid line 68 of FIG. 5. This is because the vertical motion of the vertical scanner is more nearly represented by the solid line 2604 than the desired stair step pattern 2602. The actual scan path 68 thus slopes down to the right on left-to-right scans and slopes down to the left on right-to-left scans.

One approach to providing the stair step pattern would be to drive the vertical scanner 58 with a stair step voltage. However, because the vertical mirror is a physical system and the stair step involves discontinuous motion, the vertical mirror will not follow the drive signal exactly. Instead, as the vertical mirror attempts to follow the stair step pattern, the vertical mirror will move at a maximum rate indicated largely by the size and weight of the vertical mirror, the material properties of the mirror support structure, the peak voltage or current of the driving signal, the electrical properties of the driving circuitry, and the torque of the actuator. For a typical vertical scan mirror size, configuration, scan angle and driving voltage, the vertical scanner 58 is limited to frequencies on the order of 100 to 3000 Hz. The desired scan pattern has frequency components far exceeding this range. Consequently, driving the vertical scanner 58 with a stair step drive signal can produce a vertical scan pattern that deviates significantly from the desired pattern.

Figure 5:
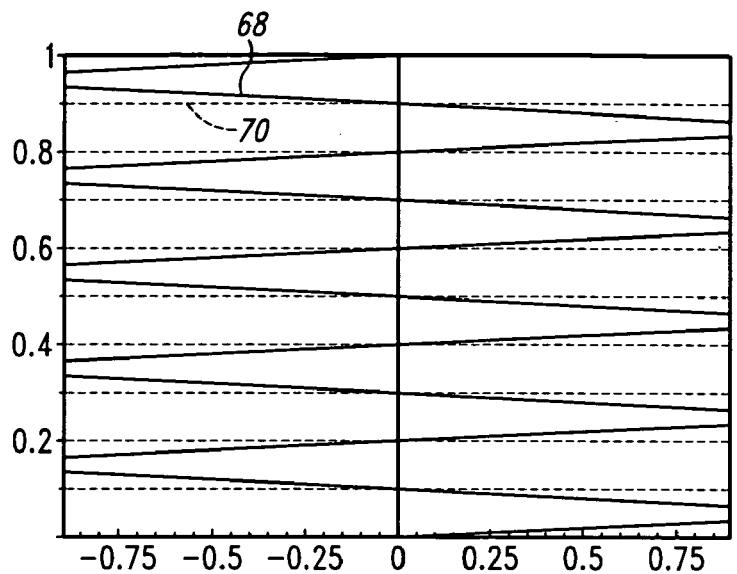
FIG. 5 is a simplified signal position diagram showing the path followed by the scanned beam in response to the signals of FIG. 4, as compared to a desired raster scan path.

To correct for this deviation from the desired scan pattern, the active correction scanner 100 can be actuated at approximately twice the horizontal scanner frequency to produce an offset, such that the beam more closely follows the desired scan pattern 70 of FIG. 5. A variety of approaches to adding this correction offset are described in U.S. Pat. No. 6,140,979 to Gerhard. Additionally, to ease matching of the correction frequency with the horizontal scan frequency or to the horizontal rate of the image signal, the MEMS scanners may be modified to provide active or passive frequency control, as described in U.S. Pat. No. 6,285,489 to Helsel, et al entitled FREQUENCY TUNABLE RESONANT SCANNER WITH AUXILIARY ARMS which is incorporated herein by reference.

One way to run the correction mirror is indicated in FIG. 27. Here, the horizontal mirror angle is shown as a sinusoidal waveform 2702. The horizontal mirror resonates between respective left and right maximum deflections $-\Theta_{MAX}$ and $\Theta_{MAX}$. The field-of-view (FOV) is chosen to be somewhat narrower, ranging from $-\Theta_{FOV}$ TO $\Theta_{FOV}$. Superimposed, for purposes of clarity, is a correction mirror waveform 2704. In this example, the correction mirror is driven in a progressive scan between $t_1$ and $t_2$ that deflects the beam downward somewhat while the scan beam is in the portion of its scan where it enters the FOV, and upward where it exits the FOV. For a right-to-left scan corresponding to the downward portion of the horizontal waveform, this results in the beam being placed somewhat lower than its nominal vertical position in the right half of the FOV and somewhat higher than its nominal vertical position in the left half of the FOV. Similarly, for a left-to-right scan corresponding to the upslope of waveform 2702, waveform 2704 indicates the beam to be deflected somewhat below its nominal vertical position in the left half of the FOV and somewhat above its nominal vertical position in the right half of the FOV. The correction mirror performs a flyback during the period where the nominal beam position is beyond the selected FOV.

The net effect of the beam correction indicated by FIG. 26 is to make the vertical scan more nearly approach the ideal stairstep path 2602 than the linear path 2604, the beam vertical position remaining more constant during the period when the beam is traversing the FOV. The correction mirror thus offsets the nominal movement of the vertical scan mirror during the horizontal scan. Looked at another way, the beam path more nearly approximates the ideal raster pattern ;70 than the pinched pattern 68 of FIG. 5.

As an alternative to the roughly sawtooth correction mirror waveform of FIG. 15, the correction mirror may be driven in a sinusoidal pattern or other pattern that results in the raster pattern being less pinched than scan pattern 68 of FIG. 5. For driving in a sinusoidal pattern, the primary drive frequency is set at twice the horizontal drive frequency. The phase is set such that the correction scan crosses midpoint both when the horizontal scan passes midpoint and when it reaches $\pm\Theta_{MAX}$, and such that the correction mirror deflects the beam downward as the horizontal scan mirror passes through the first half of the FOV and upward as it passes through the second half of the FOV (in both left-to-right and right-to-left scan directions).

FIG. 28 shows another embodiment of a scanning assembly 82 that employs a biaxial scanner 1090 as the principal scan component. The biaxial scanner 1090 is a single mirror device that oscillates about two orthogonal axes. General design, fabrication and operation of such scanners are described for example in U.S. Pat. No. 5,629,790, entitled Micromachined Torsional Scanner, by Neukermans et al.; in Asada, et al, Silicon Micromachined Two-Dimensional Galvano Optical Scanner, IEEE Transactions on Magnetics, Vol. 30, No. 6, 4647–4649, November 1994; and in Kiang et al, Micromachined Microscanners for Optical Scanning, SPIE proceedings on Miniaturized Systems with Micro-Optics and Micromachines II, Vol. 3008, February 1997, pp. 82–90; each of which is incorporated herein by reference. The bi-axial scanner 1090 includes integral sensors that provide electrical feedback of the mirror position to the scan controller 2032, as is described in U.S. Pat. No. 5,648,618 to Neukermans et al., entitled MICROMACHINED HINGE HAVING AN INTEGRAL TORSIONAL SENSOR, which was incorporated by reference above.

As noted previously, the scanner of FIGS. 9A and 9B may incorporate two or more drive approaches to produce motion about one or more of the axes. Several embodiments were illustrated in FIGS. 11–13. In the embodiment shown in FIG. 28, a central scan plate 180 is positioned above a pair of capacitive plate electrodes 194 and 196 and supported by respective torsion arms 182 and 184 extending from a gimbal ring 2026. A mirror 181 is formed on the top surface of scan plate 180.

The gimbal ring 2026 is supported in turn by a pair of vertical torsion arms 2040 and 2041 that extend from a substrate 92. Substrate 92, which comprises a portion of the MEMS die, is in turn supported by support plate 1112. Because the vertical scan torsion arms 2040 and 2041 are orthogonal to the horizontal scan torsion arms 182 and 184, the gimbal ring 2026 can pivot about an axis orthogonal to that of the central scan plate 180.

Similarly to the previously described embodiment of FIG. 12, a set of fingers 1102 extend from the scan plate 180 and interleave a set of fingers 1108 that extend from the gimbal ring 2026. In some embodiments, the fingers 1108 are vertically offset from the fingers 1102.

In operation, an electronic drive circuit 2032 applies a drive voltage between the electrodes 194,196 and the scan plate 180. The drive voltage produces torque about the torsion arms 182,184 in a manner similar to that described above.

Simultaneously, the drive circuit 2032 provides a voltage between the fingers 1102 and 1108 that produces a rotational torque about the torsion arms 182, 184. Because the finger and electrode voltages are synchronized, their resulting torques jointly provide rotation of the scan plate 180 relative to the gimbal ring 2026.

The gimbal ring 2026 is also dual drive in this embodiment. The gimbal ring 2026 includes an integral moving comb 2024 with fingers that extend into a fixed comb 2030 that extends from the substrate 92. The gimbal ring 2026 also carries a coil 2048 that is insulated from the main body of the gimbal ring 2026 by an insulative layer, such as silicon dioxide.

To provide vertical scanning, the drive circuit 2032 provides a driving voltage between the combs 2024, 2030 and a drive current to the coil 2048. As described previously, the voltage applied between the combs 2024, 2030 produces a torque about the torsion arms 2040, 2041. Simultaneously, the drive current interacts with a fixed B-field from a pair of opposed magnets (not shown) and provides supplemental torque to the gimbal ring 2026. Responsive to the electrostatic and electromagnetic torques, the gimbal ring 2026 pivots about the torsion arms 2040, 2041. The angle and frequency at which the mirror pivots is a function of the mechanical characteristics and dimensions of the torsion arms and gimbal ring 2026, as well as the amount of electromagnetic force from the current interacting with the B-field, the amount of electrostatic force from the electrodes, and the frequency and waveform with which the coil and electrodes are driven.

While the two-dimensional embodiment described herein incorporates comb and electrostatic drive for scan plate 180 and comb and electromagnetic drive for the gimbal ring 2026, other combinations of drives may be within the scope of the invention. Moreover, like the two scanner system described above with reference to FIGS. 3 and 8, such biaxial scanners may suffer similar raster pinch problems due to movement along the slower scan axis during sweeps along the faster scan axis and the techniques described herein may be applied where desirable. The techniques referenced previously may be applied to biaxial scanning imaging systems.

Although the embodiments described herein have been displays, other devices or methods may be within the scope of the invention. For example, as shown in FIG. 29, an imager 600 includes a biaxial MEMS scanner 1090 and correction scanner 100 that together function similarly to scan module 82 of FIG. 8. The imager 600 is an image collecting device that may be the input element of a digital camera, bar code reader, two dimensional symbol reader, document scanner, endoscope, confocal microscope or other image acquisition device.

The imager 600 also includes a set of high brightness light sources 50, such as LEDs or lasers that output substantially continuous beams of light toward the correction scanner 100 and bidirectional scanner 1090. Each of the light sources 50 emits light of a selected wavelength that is different from that of the other light sources 50 to ease differentiation of beams, although in some applications common wavelength devices may be used, as will be described below. As will be also described below, the use of light of different wavelengths allows light from the respective light sources to be treated independently of that from the other light sources. In one example of a multiwavelength structure where imager 600 is a symbol reader, the illumination sources 50 may include infrared or red light emitters that emit beams of light into a beam splitter 616. In such a configuration, the interleaved approach using a plurality of beams, described below, may be preferred. Alternatively, the light emitters may direct light using optical fibers as shown in FIGS. 3 and 8.

The beam splitter 616 directs the illuminating light beams toward the correction scanner 100 where the illuminating light is redirected to the biaxial scanner 1090. The biaxial scanner 1090 scans through a generally raster pattern to direct light from the light sources 50 onto respective locations on a target object 608. Movement of the biaxial scanner 1090 thus translates to the illuminating successive points of the target object 608. Because the illuminating light beams are not collinear, the illuminating light beams strike the target object 608 at separate series of locations. The locations struck by the beam may be substantially spatially separate contiguous, such as described with reference to FIGS. 22–24 or may be interleaved lines, similar to an interlaced cathode ray tube scanning pattern, depending upon the alignment of the particular light sources with respect to the scanner. While a typical interlaced monitor or television uses a single beam that sweeps a first set of lines followed by a second pass in which the beam sweeps the interleaved set of lines, the approach described herein is not so limited. In some applications, two or more beams may be swept simultaneously across two or more interleaved lines.

As each beam strikes the target object 608, a portion of the beam's light is reflected toward the imager 600. The amount of light reflected to the imager 600 is a function of the reflectivity of the location struck by the beams.

To allow the imager 600 to gather light efficiently, the imager 600 includes gathering optics 606 that collect and transmit light from a target object 608 outside of the imager 600 onto a set of photodetectors 614. The gathering optics 606 are configured to have a field of view and other optical characteristics appropriate for the particular application. For example, where the imager 600 is a two dimensional symbology reader, the gathering optics 606 may be optimized for red or infrared light. The optics may also be positioned at other locations along the optical path to allow smaller, cheaper components to be used.

Because each photodetector 614 is sensitive only to light of its respective light beam, each of the photodetectors 614 can separately detect light from the respective set of locations struck by its respective light beam. Each photodetector 614 converts the received light energy at its corresponding wavelength into an electrical signal that is received by decoding electronics 612. The decoding electronics 612 converts the electrical signals into data and processes the data to construct an overall data map representing the reflectivity of all of the regions scanned by the light beams. Consequently, the overall data map represents an image of a portion of the target object 608. The decoding electronics 612 can then perform additional processing to identify information represented by the reflectivity pattern or to produce data for further applications, such as printing. For example, where the imager 600 is a symbology reader, the decoding electronics 612 may include symbol decoding and storing circuitry and further electronics for assembling the image form the stored files. Where the imager is a portion of a camera, the decoding electronics 612 may include digital-to-analog converters, memory devices, and associated electronics for storing a digital representation of the scanned area and further electronics for assembling the image from the stored data. One skilled in the art will recognize that, although the correction scanner 100 is positioned before the bi-axial scanner 1090 in this embodiment, it may be desirable to position the correction scanner 100 following the bi-axial scanner 1090 in some applications.

While the embodiments described with respect to FIG. 29 use photodetectors 614 that are sensitive to the respective wavelengths of their respective sources, other approaches to simultaneously detecting a plurality of locations on the target object may be employed. For example, each of the light sources 50 may be modulated at a respective carrier frequency. A single photodetector or a plurality of photodetectors can then receive reflected light from the target object 608 and produce an electrical signal corresponding to the reflected light. By synchronously demodulating the electrical signal using conventional heterodyning or similar techniques, each of the frequency components corresponding to the respective light beams can be identified and treated separately.

While the modulated beam approach and the interleaved approach have been described separately, the two approaches are not necessarily mutually exclusive. For example, to further ease discrimination between beams, the modulated beam approach may be combined with the interleaved approach. Moreover, while the embodiments described above incorporate beams that converge on a single mirror, in some applications it may be desirable to use a plurality of scanning mirrors scanning respective beams or sets of beams. For example, separate scanner assemblies can allow a user to increase the imager's field of view or lines of resolution in a modular approach. Alternatively, to ease assembly or alignment, the scanning assembly can include a plurality of adjacent mirrors fabricated as an integral portion of a silicon wafer.

The separate scan beams generated by each light source 50 may alternatively be made to scan substantially the same field of view. For the case of separate scan mirrors 1090, such mirrors may be spaced apart to create a plurality of perspective views of the target object 608. Such perspective views are affected to a greater or lesser degree by spectral scattering of their respective beams on the target object surface, depending upon the target object's orientation to each perspective and the gloss characteristics of the target object surface. When the signals received by each corresponding detector 614 are decoded, the specular response from each respective beam will vary to create decodable regions and non-decodable regions. Thus, the use of a plurality of perspective views may be used to decode a symbol that would otherwise be undecodable due to specular response of the target object. The selection of the particular perspective may be made globally across a given image, or alternatively may be applied selectively; each beam providing information lost in specular response to other beams.

As an alternative to using separate bidirectional scanners 1090 spaced apart to provide redundant perspectives, a single scanner may be used in combination with post scanner optics to provide a plurality of perspectives. Such post scanner optics may include one or more mirrors, lenses, or holographic elements or combinations thereof.

In one embodiment of the imager 600 of FIG. 29, one or more of the illumination sources 614 includes a visible, directly modulated light source, such as a red laser diode or a visible wavelength light emitted diode (LED). As shown in FIG. 30, the visible illumination source 50 can thus produce a visible image for the user. In the exemplary embodiment of FIG. 30, the imager can operate as a symbology scanner to identify information contained in a symbol on the target object 608. Once the decoding electronics 612 identifies a desired image to be viewed, such as an item price and identity, the decoding electronics 612 modulates the drive current of the illumination sources 50 to modulate the intensity of the emitted light according to the desired image. When the user directs the imager 600 toward a screen 619 (or the target object), the illuminating light is scanned onto the screen 619 as described above. Because the illuminating light is modulated according to the desired image, the visible light reflected from the screen 619 is spatially modulated according to the desired image. The imager 600 thus acts as an image projector in addition to acquiring image data. In addition to, or as an alternative to, modulating the diode to produce an image, the light sources 50 corresponding to each of the regions of the target object 608 may also output continuous or pulsed beams of light that fill the entire field of view of the imager 600. The imager 600 thus provides a spotter frame 618 that indicates the field of view to the user. Similarly, the illumination sources 50 can be modified to outline the field of view or to produce other indicia of the field of view, such as cross hatching or fiducials, to aid the user in aligning the imager 600 to the target object 608.

Although the invention has been described herein by way of exemplary embodiments, variations in the structures and methods described herein may be made without departing from the spirit and scope of the invention. For example, the positioning of the various components may also be varied. In one example of repositioning, the correction scanners can be positioned in the optical path either before or after the other scanners. Also, an exit pupil expander may be added or omitted in many applications. In such embodiments, conventional eye tracking may be added to ease coupling of the scanned beam to the eye. Moreover, the scanning system can be used for projection displays, optical storage and a variety of other scanned light beam applications, in addition to scanned retinal displays. Additionally, in some applications it may be desirable for ease of positioning or for other reasons to use a plurality of scanners, each of which may be fed by one or more beams. In such a structure, each scanner and its corresponding light sources produce respective sets of tiles. The overall image is than formed by combining the sets of tiles from each of the scanners, either by adjacent positioning or by overlapping. Although overlapping is generally preferred only where each scanner is used for a respective wavelength, in some applications overlapping may be used for interlacing or other approaches to image combination.

Moreover, although the exemplary scanning assemblies described herein utilize torsionally mounted mirrors, other scanning assembly structures, such as spinning polygons, comb drive mirrors, acousto-optic scanners, and other scanning structures may be within the scope of the invention. Additionally, while the actuators described herein are carried by the central body, the actuators may be mounted, carried, or otherwise coupled elsewhere, including coupling directly to the torsion arms. Also, while the beams are shown as converging upon a single scanner, in some applications it may be desirable to use separate scanners for each beam of light or to use a plurality of scanners that each reflect a plurality of beams. Accordingly, the invention is not limited except as by the appended claims.

What is claimed is:

1. A microelectromechanical resonant device, comprising:
a base;
a movable body coupled to the base for resonant motion relative to the base about a pivot axis;
a comb drive coupled to the movable body and oriented to produce a torque about the pivot axis; and
a magnetic coil carried by the movable body and oriented to produce a torque about the pivot axis;
wherein the base and movable body are both formed from a semiconductor material.

2. The microelectromechanical resonant device of claim 1 further including:
a first substantially planar electrode carried by the movable body; and
a second electrode positioned to produce an electrical field extending between the first and second electrodes.

3. The microelectromechanical resonant device of claim 1 wherein the movable body and a portion of the comb drive form an integral body.

4. The microelectromechanical resonant device of claim 1 wherein the movable body includes a polysilicon material.

5. The microelectromechanical resonant device of claim 1 further comprising a gimbal ring interposed between the base and the movable body, the frame being coupled to the base and configured for movement about a second axis substantially orthogonal to the pivot axis.

* * * * *